(12) United States Patent
Sperry et al.

(10) Patent No.: US 11,691,120 B1
(45) Date of Patent: Jul. 4, 2023

(54) EXHAUST GAS AFTERTREATMENT SYSTEMS

(71) Applicant: Cummins Emission Solutions Inc., Columbus, IN (US)

(72) Inventors: Robert G. Sperry, Columbus, IN (US); Chetan Kishorrao Chawane, Pune (IN); Karan Shaileshkumar Chinaiwala, Surat (IN); Enoch Nanduru, Pune (IN)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 0 days.

(21) Appl. No.: 17/556,692

(22) Filed: Dec. 20, 2021

(51) Int. Cl.
  *B01J 19/26* (2006.01)
  *F01N 3/20* (2006.01)
  *B01J 19/18* (2006.01)
  *B01D 53/94* (2006.01)

(52) U.S. Cl.
  CPC ............ *B01J 19/26* (2013.01); *B01D 53/944* (2013.01); *B01D 53/9431* (2013.01); *B01J 19/1862* (2013.01); *F01N 3/2066* (2013.01); *B01J 2219/1943* (2013.01); *B01J 2219/1946* (2013.01); *F01N 2240/20* (2013.01); *F01N 2260/18* (2013.01); *F01N 2330/38* (2013.01); *F01N 2610/02* (2013.01); *F01N 2610/08* (2013.01); *F01N 2610/146* (2013.01); *F01N 2610/1453* (2013.01); *F01N 2610/1493* (2013.01); *F01N 2900/14* (2013.01); *F01N 2900/1806* (2013.01); *F01N 2900/1824* (2013.01)

(58) Field of Classification Search
  CPC combination set(s) only.
  See application file for complete search history.

(56) References Cited

U.S. PATENT DOCUMENTS

| 7,077,102 | B1 | 7/2006 | Stowe |
| 9,957,868 | B2 | 5/2018 | Johnson |
| 10,508,579 | B2 | 12/2019 | Fischer et al. |
| 2011/0146236 | A1* | 6/2011 | Sun ..................... F01N 13/011 60/299 |

(Continued)

FOREIGN PATENT DOCUMENTS

| EP | 2 944 371 A1 | 11/2018 |
| JP | 2014-223610 | 12/2017 |

*Primary Examiner* — Binh Q Tran
(74) *Attorney, Agent, or Firm* — Foley & Lardner LLP

(57) ABSTRACT

An exhaust gas aftertreatment system includes a housing assembly and a reductant delivery system. The housing assembly includes an upstream housing, a first inlet tube, a second inlet tube, and a mixing housing. The first inlet tube is coupled to the upstream housing and configured to receive a first portion of exhaust gas from the upstream housing. The second inlet tube is coupled to the upstream housing and configured to receive a second portion of the exhaust gas from the upstream housing. The mixing housing is coupled to the first inlet tube and the second inlet tube. The mixing housing is configured to receive the first portion of the exhaust gas from the first inlet tube and receive the second portion of the exhaust gas from the second inlet tube. The mixing housing is separated from the upstream housing by the first inlet tube and the second inlet tube.

24 Claims, 34 Drawing Sheets

(56) References Cited

U.S. PATENT DOCUMENTS

| | | | |
|---|---|---|---|
| 2011/0146253 A1* | 6/2011 | Isada | F01N 13/04 |
| | | | 60/324 |
| 2013/0333363 A1* | 12/2013 | Joshi | B01F 25/4521 |
| | | | 60/324 |
| 2016/0194995 A1* | 7/2016 | Weiss | F01N 13/011 |
| | | | 60/324 |
| 2018/0163600 A1* | 6/2018 | Kane | F02B 37/001 |
| 2020/0300146 A1* | 9/2020 | Chenoweth | B01F 31/10 |
| 2021/0113973 A1* | 4/2021 | Uysal | B01F 25/432 |

* cited by examiner

EXHAUST GAS AFTERTREATMENT SYSTEMS

TECHNICAL FIELD

The present disclosure relates generally to exhaust gas aftertreatment systems for an internal combustion engine.

BACKGROUND

For an internal combustion engine system, it may be desirable to reduce emissions of certain components in exhaust gas produced by a combustion of fuel. One approach that can be implemented to reduce emissions is to treat the exhaust gas using an aftertreatment system. It is often desirable to mix exhaust gas with a reductant used to treat the exhaust gas. However, it can be difficult to desirably mix the reductant with the exhaust gas. For example, space constraints on the aftertreatment system can make it difficult to desirably mix the exhaust gas and the reductant in some applications.

SUMMARY

In one embodiment, an exhaust gas aftertreatment system includes a housing assembly and a reductant delivery system. The housing assembly includes an upstream housing, a first inlet tube, a second inlet tube, and a mixing housing. The first inlet tube is coupled to the upstream housing and configured to receive a first portion of exhaust gas from the upstream housing. The second inlet tube is coupled to the upstream housing and configured to receive a second portion of the exhaust gas from the upstream housing. The mixing housing is coupled to the first inlet tube and the second inlet tube. The mixing housing is configured to receive the first portion of the exhaust gas from the first inlet tube and receive the second portion of the exhaust gas from the second inlet tube. The mixing housing is separated from the upstream housing by the first inlet tube and the second inlet tube. The reductant delivery system includes a dosing module coupled to the mixing housing and positioned between the mixing housing, the first inlet tube, and the second inlet tube. The dosing module includes an injector that is configured to provide reductant into the mixing housing.

In another embodiment, an exhaust gas aftertreatment system includes a housing assembly and reductant delivery system. The housing assembly includes an upstream housing, a first inlet tube, a second inlet tube, a mixing housing, and a divergent housing. The upstream housing is centered on an upstream housing axis. The first inlet tube is coupled to the upstream housing and configured to receive a first portion of exhaust gas from the upstream housing. The second inlet tube is coupled to the upstream housing and configured to receive a second portion of the exhaust gas from the upstream housing. The mixing housing is coupled to the first inlet tube and the second inlet tube. The mixing housing is configured to receive the first portion of the exhaust gas from the first inlet tube and receive the second portion of the exhaust gas from the second inlet tube. The divergent housing is configured to receive the exhaust gas from the mixing housing. The divergent housing has a diameter that increases as a distance from the mixing housing increases. The reductant delivery system includes a dosing module coupled to the mixing housing. The dosing module includes an injector that is configured to provide reductant into the mixing housing.

In yet another embodiment, an exhaust gas aftertreatment system includes a housing assembly and a reductant delivery system. The housing assembly includes an upstream housing, a first inlet tube, a second inlet tube, a mixing housing, and a decomposition housing. The upstream housing is centered on an upstream housing axis. The first inlet tube is coupled to the upstream housing, centered on a first inlet tube axis parallel to the upstream housing axis, and configured to receive a first portion of exhaust gas from the upstream housing. The second inlet tube is coupled to the upstream housing, centered on a second inlet tube axis parallel to the upstream housing axis, and configured to receive a second portion of the exhaust gas from the upstream housing. The mixing housing is coupled to the first inlet tube and the second inlet tube. The mixing housing is configured to receive the first portion of the exhaust gas from the first inlet tube and receive the second portion of the exhaust gas from the second inlet tube. The mixing housing is separated from the upstream housing by the first inlet tube and the second inlet tube. The decomposition housing is coupled to the mixing housing and configured to receive the exhaust gas from the mixing housing. The decomposition housing has a decomposition housing diameter that is constant and centered on a decomposition housing axis that is coincident with the upstream housing axis. The reductant delivery system includes a dosing module that is coupled to the mixing housing. The dosing module includes an injector that is configured to provide reductant into the mixing housing.

An exhaust gas aftertreatment system includes a housing assembly and a reductant delivery system. The housing assembly includes an upstream housing, a first inlet tube, a second inlet tube, a mixing housing, and a decomposition housing. The upstream housing is centered on an upstream housing axis. The first inlet tube is coupled to the upstream housing, centered on a first inlet tube axis parallel to the upstream housing axis, and configured to receive a first portion of exhaust gas from the upstream housing. The second inlet tube is coupled to the upstream housing, centered on a second inlet tube axis parallel to the upstream housing axis, and configured to receive a second portion of the exhaust gas from the upstream housing. The mixing housing is coupled to the first inlet tube and the second inlet tube. The mixing housing is configured to receive the first portion of the exhaust gas from the first inlet tube and receive the second portion of the exhaust gas from the second inlet tube. The mixing housing is separated from the upstream housing by the first inlet tube and the second inlet tube. The decomposition housing is coupled to the mixing housing and configured to receive the exhaust gas from the mixing housing, the decomposition housing having a diameter that is constant and centered on a decomposition housing axis that is coincident with the upstream housing axis. The reductant delivery system includes a dosing module and a dosing lance. The dosing module includes an injector. The dosing lance is coupled to the dosing module and configured to receive reductant from the injector and to provide the reductant into the mixing housing. The dosing lance extends within the mixing housing.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which.

It will be recognized that the Figures are schematic representations for purposes of illustration. The Figures are provided for the purpose of illustrating one or more implementations with the explicit understanding that the Figures will not be used to limit the scope or the meaning of the claims.

DETAILED DESCRIPTION

Following below are more detailed descriptions of various concepts related to, and implementations of, methods, apparatuses, and for providing a housing assembly for an exhaust gas aftertreatment system of an internal combustion engine. The various concepts introduced above and discussed in greater detail below may be implemented in any of a number of ways, as the described concepts are not limited to any particular manner of implementation. Examples of specific implementations and applications are provided primarily for illustrative purposes.

I. OVERVIEW

In order to reduce emissions from an internal combustion engine, it may be desirable to treat exhaust gas by injecting reductant into the exhaust gas. However, it can be difficult to desirably treat the exhaust gas with the reductant if the exhaust gas and the reductant are not desirably mixed. Ensuring that desirable mixing occurs can be challenging in some applications, such as those with physical space and size constraints. Aside from these constraints, it can be difficult to desirably mix the exhaust gas and the reductant without significantly increasing a thermal mass of an aftertreatment system. These increases in thermal mass increase a time required for the aftertreatment system to attain a temperature associated with desirable reduction of emissions of undesirable components (e.g., nitrogen oxides ($NO_x$), etc.) in the exhaust gas. As a result, additional undesirable components are emitted by the system during the time before the aftertreatment system has attained the desirable temperature.

Implementations herein are related to exhaust gas aftertreatment systems that include a housing assembly with an upstream housing, two inlet tubes coupled to the upstream housing, and a mixing housing coupled to the inlet tubes. The upstream housing, inlet tubes, and mixing housing define a decomposition housing cavity therebetween where a dosing module can be located. The dosing module includes an injector which provides reductant into the mixing housing. By locating the dosing module in the decomposition housing cavity, an overall footprint of the exhaust gas aftertreatment system may be reduced.

Additionally, the mixing housing is structured to utilize the provision of the exhaust gas from the inlet tubes to cause swirling of the exhaust gas which aides in mixing of the exhaust gas and reductant. In this way, the exhaust gas and reductant can be desirably mixed without using other mixers which would undesirably increase an overall footprint of the exhaust gas aftertreatment system.

II. OVERVIEW OF EXHAUST GAS AFTERTREATMENT SYSTEMS

Figure 1:
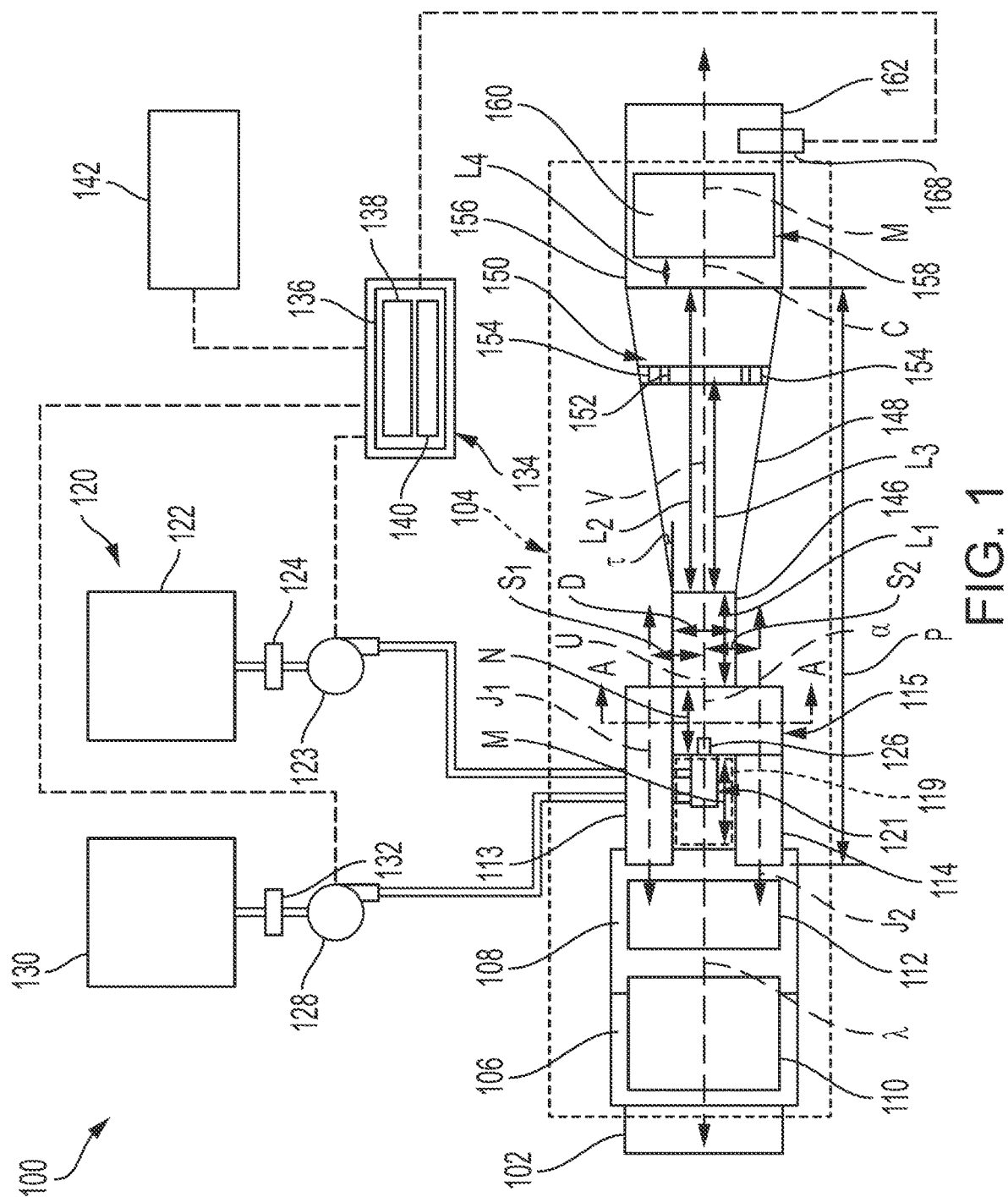
FIG. 1 is a schematic diagram of an example exhaust gas aftertreatment system including a housing assembly.

FIG. 1 depicts an exhaust gas aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). The exhaust gas aftertreatment system 100 includes an upstream exhaust gas conduit 102 (e.g., line, pipe, etc.). The upstream exhaust gas conduit 102 is configured to receive exhaust gas from an upstream component (e.g., header, exhaust manifold, turbocharger, diesel oxidation catalyst, etc.). In some embodiments, the upstream exhaust gas conduit 102 is coupled to (e.g., attached to, fixed to, welded to, fastened to, riveted to, etc.) the internal combustion engine (e.g., the upstream exhaust gas conduit 102 is coupled to an outlet of the internal combustion engine, etc.). In other embodiments, the upstream exhaust gas conduit 102 is integrally formed with the internal combustion engine. As utilized herein, two or more elements are "integrally formed" with each when the two or more elements are formed and joined together as part of a single manufacturing step to create a single-piece or unitary construction that cannot be disassembled without an at least partial destruction of the overall portion.

The exhaust gas aftertreatment system 100 also includes a housing assembly 104. The housing assembly 104 is shown in FIGS. 1-5 and 7-22 according to various embodiments. The housing assembly 104 is substantially straight (e.g., in an in-line configuration, etc.) such that exhaust gas substantially flows in a single direction (e.g., from left to right, from front to back, etc.). The housing assembly 104 does not include switchbacks or other structures for reversing flow of a substantial portion of the exhaust gas (e.g., from right to left, from back to front, etc.).

The housing assembly 104 includes an intake body 106 (e.g., chamber, etc.). The intake body 106 is configured to receive exhaust gas from the upstream exhaust gas conduit 102. The housing assembly 104 also includes an upstream housing 108 (e.g., chamber, body, etc.). The upstream housing 108 is configured to receive exhaust gas from the intake body 106. In various embodiments, the upstream housing 108 is coupled to the intake body 106. For example, the upstream housing 108 may be fastened (e.g., using a band, using bolts, etc.), welded, riveted, or otherwise attached to the intake body 106. In other embodiments, the upstream housing 108 is integrally formed with (e.g., unitarily formed with, formed as a one-piece construction with, inseparable from, etc.) the intake body 106.

The upstream housing 108 is centered on an upstream housing axis λ. In other words, a center point of a cross-section of the upstream housing 108 is disposed on the upstream housing axis λ along a length of the upstream housing 108. The exhaust gas may be provided (e.g., output, etc.) through the upstream housing 108 in a direction that is parallel to, or coincident with, the upstream housing axis λ.

The housing assembly 104 may include a heater (e.g., electrical heater, resistance heater, fluid heat exchanger, etc.) that is configured to heat the exhaust gas within the intake body 106 and/or the upstream housing 108. For example, the housing assembly 104 may include a heater that extends within the intake body 106 and is configured to heat the exhaust gas within the intake body 106. By heating the exhaust gas, catalytic reactions performed by catalyst members may increase and become more desirable. Additionally, heating the exhaust gas may facilitate regeneration of (e.g., burn-off of particulates from, etc.) various components of the exhaust gas aftertreatment system 100.

In various embodiments, the exhaust gas aftertreatment system 100 also includes an oxidation catalyst 110 (e.g., a diesel oxidation catalyst (DOC), etc.). At least a portion of the oxidation catalyst 110 is positioned within (e.g., contained within, housed within, located in, etc.) the upstream housing 108. In various embodiments, the oxidation catalyst 110 is positioned within the upstream housing 108 and the intake body 106. In other embodiments, the oxidation catalyst 110 is positioned within the upstream housing 108 and is not positioned within the intake body 106. In still other embodiments, the oxidation catalyst 110 is positioned within the intake body 106 and is not positioned within the upstream housing 108.

The exhaust gas is provided by the intake body 106 to the oxidation catalyst 110. The oxidation catalyst 110 may be configured to oxidize hydrocarbons and/or carbon monoxide in the exhaust gas. In this way, the oxidation catalyst 110 may remove hydrocarbons and/or carbon monoxide from the exhaust gas prior to the exhaust gas being provided to downstream components of the exhaust gas aftertreatment system 100. The oxidation catalyst 110 may be positioned within the intake body 106 and/or the upstream housing 108 (e.g., using a gasket, using a spacer, using a seal, etc.) such that flow of the exhaust gas between the oxidation catalyst and the intake body 106 and/or between the oxidation catalyst 110 and the upstream housing 108 is substantially prevented (e.g., less than 1% of the exhaust gas flow received by the intake body 106 flows between the oxidation catalyst 110 and the intake body 106, less than 1% of the exhaust gas flow received by the intake body 106 flows between the oxidation catalyst 110 and the upstream housing 108, etc.).

The oxidation catalyst 110 may also be centered on the upstream housing axis λ. For example, where a diameter of the oxidation catalyst 110 is approximately (e.g., within 5% of, etc.) equal to a diameter of the upstream housing 108, a center point of a cross-section of the oxidation catalyst 110 may be disposed on the upstream housing axis λ, along a length of the oxidation catalyst 110. The exhaust gas may be provided through the oxidation catalyst 110 in a direction that is parallel to, or coincident with, the upstream housing axis λ. As utilized herein, the term "diameter" connotes a length of a chord passing through a center point of a shape (e.g., square, rectangle, hexagon, circle, ellipse, pentagon, triangle, etc.).

In various embodiments, the exhaust gas aftertreatment system 100 also includes an exhaust gas filtration device 112 (e.g., a diesel particulate filter (DPF), etc.). The exhaust gas filtration device 112 is positioned within the upstream housing 108. For example, the exhaust gas filtration device 112 may be positioned within the upstream housing 108 downstream of the oxidation catalyst 110. The exhaust gas is provided by the oxidation catalyst 110 into the upstream housing 108 (e.g., between the oxidation catalyst 110, the upstream housing 108, and the exhaust gas filtration device 112, etc.) and subsequently into the exhaust gas filtration device 112 (e.g., after hydrocarbons in the exhaust gas have been oxidized by the oxidation catalyst 110, after carbon monoxide in the exhaust gas has been oxidized by the oxidation catalyst 110, etc.).

The exhaust gas filtration device 112 may remove particulates (e.g., soot, etc.) from the exhaust gas prior to the exhaust gas being provided to downstream components of the exhaust gas aftertreatment system 100. The exhaust gas filtration device 112 may be positioned within the upstream housing 108 (e.g., using a gasket, using a spacer, using a seal, etc.) such that flow of the exhaust gas between the exhaust gas filtration device 112 and the upstream housing 108 is substantially prevented (e.g., less than 1% of the exhaust gas flow received by the intake body 106 flows between the exhaust gas filtration device 112 and the upstream housing 108, etc.).

The exhaust gas filtration device 112 may be centered on the upstream housing axis $\lambda$. For example, where a diameter of the exhaust gas filtration device 112 is approximately equal to a diameter of the upstream housing 108, a center point of a cross-section of the exhaust gas filtration device 112 may be disposed on the upstream housing axis $\lambda$, along a length of the exhaust gas filtration device 112. The exhaust gas may be provided through the exhaust gas filtration device 112 in a direction that is parallel to, or coincident with, the upstream housing axis $\lambda$.

The housing assembly 104 also includes a first inlet tube 113 (e.g., inlet conduit, pipe, etc.). The first inlet tube 113 is located downstream of the upstream housing 108 and configured to receive a first portion of the exhaust gas from the upstream housing 108. In various embodiments, the first inlet tube 113 is coupled to the upstream housing 108. For example, the first inlet tube 113 may be fastened (e.g., using a band, using bolts, etc.), welded, riveted, or otherwise attached to the upstream housing 108. In other embodiments, the first inlet tube 113 is integrally formed with the upstream housing 108. As utilized herein, the term "tube" connotes a structure within which exhaust gas may flow, the structure having a cross-sectional shape that is circular, elliptical, square, rectangular, triangular, hexagonal, pentagonal, or otherwise similarly shaped.

The first inlet tube 113 is located downstream of the exhaust gas filtration device 112 and configured to receive the exhaust gas from the exhaust gas filtration device 112 (e.g., after particulates have been removed from the exhaust gas by the exhaust gas filtration device 112, etc.). As is explained in more detail herein, the first inlet tube 113 facilitates desirable swirling of the exhaust gas, which facilitates desirable treatment of the exhaust gas.

The first inlet tube 113 is centered on a first inlet tube axis $J_1$. In other words, a center point of a cross-section of the first inlet tube 113 is disposed on the first inlet tube axis $J_1$ along a length of the first inlet tube 113. The exhaust gas may be provided through the first inlet tube 113 in a direction that is parallel to, or coincident with, the first inlet tube axis $J_1$. The first inlet tube axis $J_1$ is separated from upstream housing axis $\lambda$ (e.g., when measured on a plane along which the first inlet tube axis $J_1$ and the upstream housing axis $\lambda$ both extend, etc.) by a first separation distance $S_1$. In various embodiments, the first separation distance $S_1$ is approximately in a range of 50 millimeters (mm) to 150 mm, inclusive (e.g., 47.5 mm, 50 mm, 75 mm, 89 mm, 100 mm, 125 mm, 150 mm, 157.5 mm, etc.). As used herein, a range of X to Y includes X, Y, values between X and Y, and values approximately equal to X and approximately equal to Y.

In various embodiments, such as is shown in FIG. 1, the first inlet tube axis $J_1$ is approximately parallel to the upstream housing axis $\lambda$ (e.g., when measured on a plane along which the first inlet tube axis $J_1$ and the upstream housing axis $\lambda$ both extend, etc.). However, the first inlet tube axis $J_1$ may also be angled relative to the upstream housing axis $\lambda$.

The first inlet tube 113 has a diameter that may be constant along a length of the first inlet tube 113, such as is shown in FIG. 1. However, the diameter of the first inlet tube 113 may also vary along the length of the first inlet tube 113. For example, the diameter of the first inlet tube 113 may gradually decrease along the length of the first inlet tube 113 (e.g., such that a smallest diameter is downstream of a largest diameter, etc.).

The housing assembly 104 also includes a second inlet tube 114 (e.g., inlet conduit, pipe, etc.). The second inlet tube 114 is located downstream of the upstream housing 108 and is configured to receive a second portion of the exhaust gas from the upstream housing 108 (e.g., different from the first portion of the exhaust gas received by the first inlet tube 113, etc.). In various embodiments, the second inlet tube 114 is coupled to the upstream housing 108. For example, the second inlet tube 114 may be fastened (e.g., using a band, using bolts, etc.), welded, riveted, or otherwise attached to the upstream housing 108. In other embodiments, the second inlet tube 114 is integrally formed with the upstream housing 108.

The second inlet tube 114 is located downstream of the exhaust gas filtration device 112 and configured to receive the exhaust gas from the exhaust gas filtration device 112 (e.g., after particulates have been removed from the exhaust gas by the exhaust gas filtration device 112, etc.). As is explained in more detail herein, the second inlet tube 114 facilitates desirable swirling of the exhaust gas, which facilitates desirable treatment of the exhaust gas.

The second inlet tube 114 is centered on a second inlet tube axis $J_2$. In other words, a center point of a cross-section of the second inlet tube 114 is disposed on the second inlet tube axis $J_2$ along a length of the second inlet tube 114. The exhaust gas may be provided through the second inlet tube 114 in a direction that is parallel to, or coincident with, the second inlet tube axis $J_2$. The second inlet tube axis $J_2$ is separated from upstream housing axis $\lambda$ (e.g., when measured on a plane along which the second inlet tube axis $J_2$ and the upstream housing axis $\lambda$ both extend, etc.) by a second separation distance $S_2$. In various embodiments, the second separation distance $S_2$ is approximately in a range of 50 mm to 150 mm, inclusive (e.g., 47.5 mm, 50 mm, 75 mm, 89 mm, 100 mm, 125 mm, 150 mm, 157.5 mm, etc.).

The second separation distance $S_2$ may be approximately equal to the first separation distance $S_1$. Such a relationship between the upstream housing 108, the first inlet tube 113, and the second inlet tube 114 may be beneficial in balancing flow of the first portion of the exhaust gas (e.g., from the first inlet tube 113, etc.) and the second portion of the exhaust gas (e.g., from the second inlet tube 114, etc.).

In various embodiments, such as is shown in FIG. 1, the second inlet tube axis $J_2$ is approximately parallel to the upstream housing axis $\lambda$ (e.g., when measured on a plane along which the second inlet tube axis $J_2$ and the upstream housing axis $\lambda$ both extend, etc.). In some embodiments, such as is shown in FIG. 1, the second inlet tube axis $J_2$ is approximately parallel to the first inlet tube axis $J_1$. For example, the second inlet tube axis $J_2$ may be approximately parallel to both the second inlet tube axis $J_2$ and the upstream housing axis $\lambda$. However, the second inlet tube axis $J_2$ may also be angled relative to the upstream housing axis $\lambda$ and/or the first inlet tube axis $J_1$.

The second inlet tube 114 has a diameter that may be constant along a length of the second inlet tube 114, such as is shown in FIG. 1. However, the diameter of the second inlet tube 114 may also vary along the length of the second inlet tube 114. For example, the diameter of the second inlet tube 114 may gradually decrease along the length of the second inlet tube 114 (e.g., such that a smallest diameter is downstream of a largest diameter, etc.).

In various embodiments, the diameter of the second inlet tube 114 is approximately equal to the diameter of the first inlet tube 113. Such a relationship between the first inlet tube 113 and the second inlet tube 114 may be beneficial in balancing flow of the first portion of the exhaust gas (e.g., from the first inlet tube 113, etc.) and the second portion of the exhaust gas (e.g., from the second inlet tube 114, etc.).

The housing assembly 104 also includes a mixing housing 115 (e.g., mixer, mixing body, etc.). The mixing housing 115 is configured to receive the first portion of the exhaust gas from the first inlet tube 113 and the second portion of the exhaust gas from the second inlet tube 114. Thus, the mixing housing 115 is configured to receive the exhaust gas from the upstream housing 108 (e.g., after hydrocarbons in the exhaust gas have been oxidized by the oxidation catalyst 110, after carbon monoxide in the exhaust gas has been oxidized by the oxidation catalyst 110, etc.). As is explained in more detail herein, the mixing housing 115 is configured to facilitate introduction of reductant (e.g., diesel exhaust fluid (DEF), Adblue®, a urea-water solution (UWS), an aqueous urea solution (e.g., AUS32, etc.), into the exhaust gas while also facilitating swirling of the exhaust gas, so as to facilitate reduction of emission of undesirable components (e.g., nitrogen oxides ($NO_x$), etc.) in the exhaust gas.

The mixing housing 115 is coupled to the first inlet tube 113 and the second inlet tube 114. For example, the mixing housing 115 may be fastened (e.g., using a band, using bolts, etc.), welded, riveted, or otherwise attached to the first inlet tube 113 and/or the second inlet tube 114. In other embodiments, the mixing housing 115 is integrally formed with the first inlet tube 113 and/or the second inlet tube 114.

In various embodiments, the mixing housing 115 may be configured to facilitate swirling of the exhaust gas around the upstream housing axis λ. For example, the mixing housing 115 may be centered on the upstream housing axis λ, as shown in FIG. 1. In another example, the mixing housing 115 may be symmetric about a plane bisecting the mixing housing 115 and along which the upstream housing axis λ extends. Such configurations may result in the housing assembly 104 producing minimal pressure drop, which would be desirable because relatively high pressure drops result in decreased performance of an internal combustion engine associated with the housing assembly 104.

Figure 2:
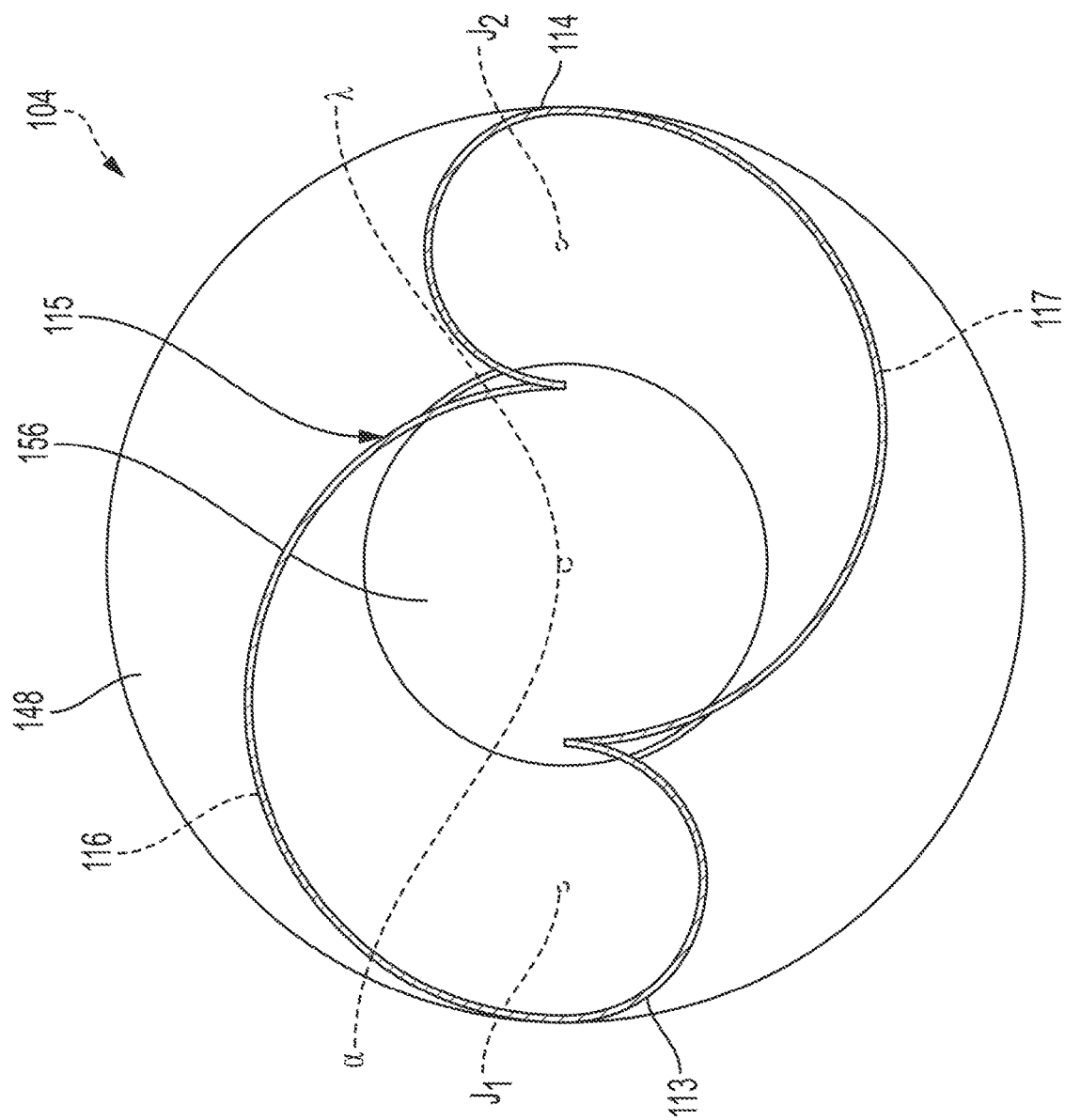
FIG. 2 is a cross-sectional view of the housing assembly shown in FIG. 1 taken along plane A-A in FIG. 1.
Figure 3:
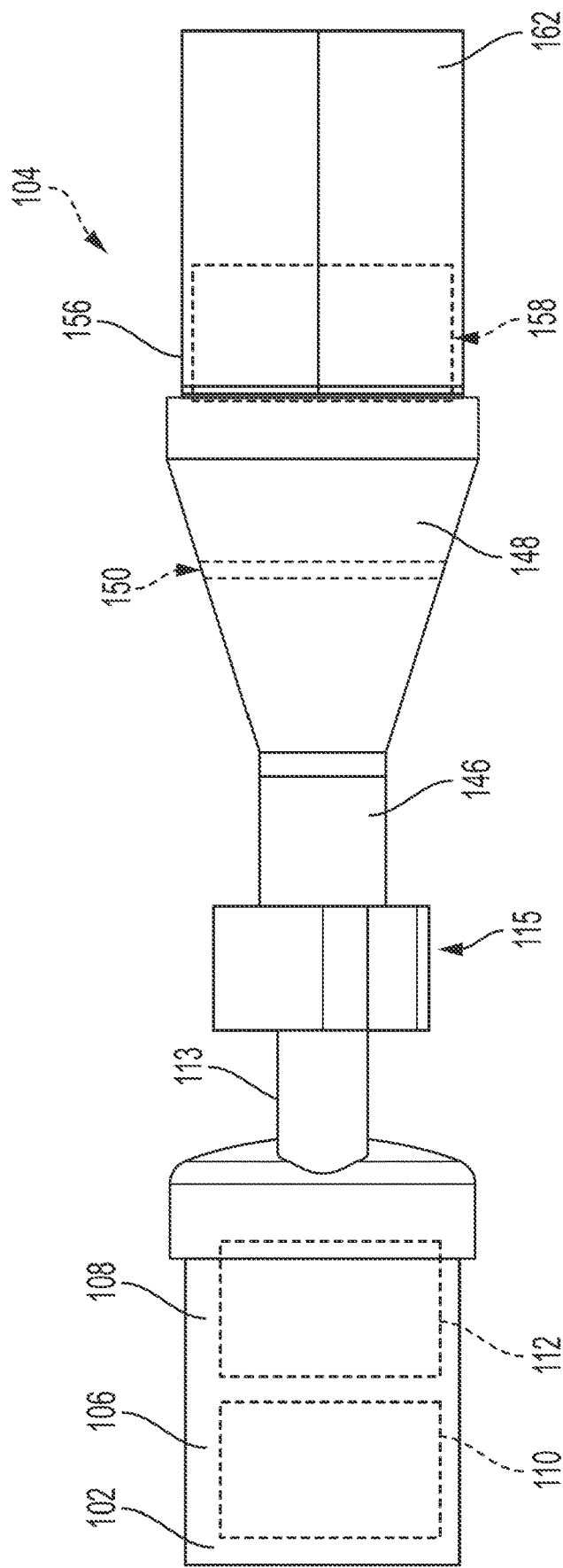
FIG. 3 is a side view of an example housing assembly for an exhaust gas aftertreatment system.
Figure 4:
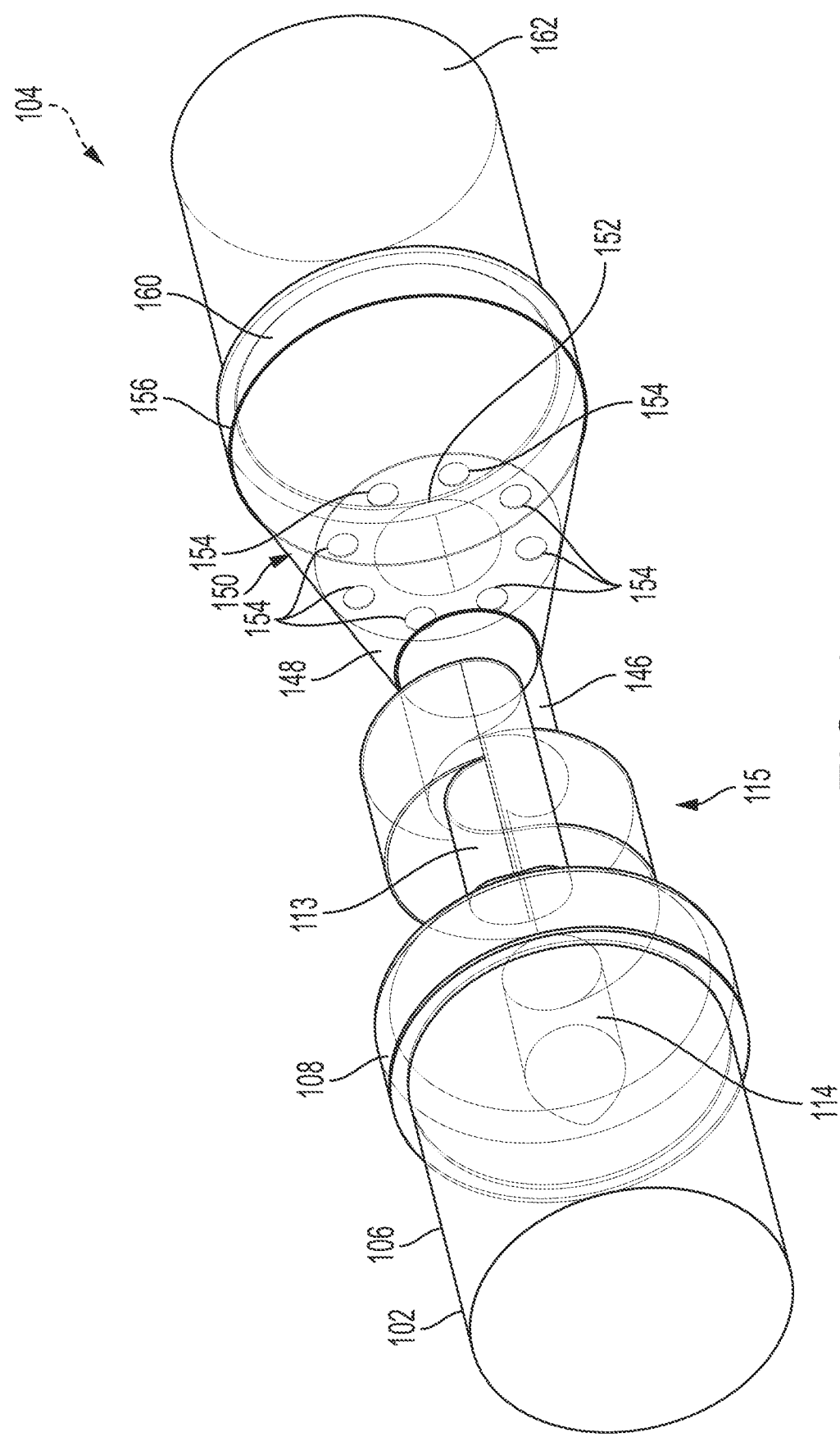
FIG. 4 is a front perspective view of the housing assembly shown in FIG. 3.
Figure 5:
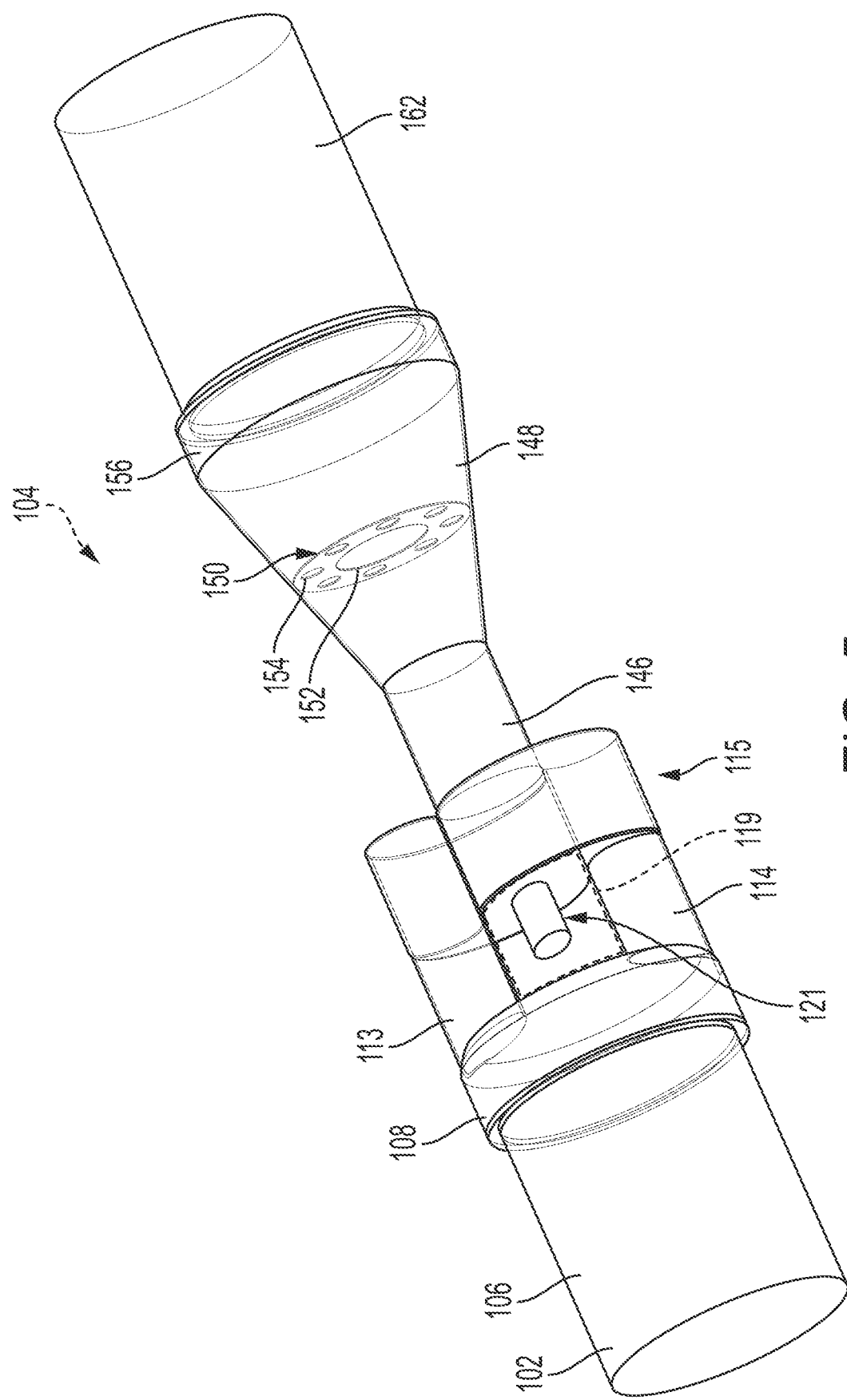
FIG. 5 is a side perspective view of the housing assembly shown in FIG. 3.

The first inlet tube 113 and the second inlet tube 114 may be circular in cross section and the mixing housing 115 may be spiral-shaped (e.g., shaped as two involutes, etc.), such as is shown in FIG. 2. The mixing housing 115 includes a first curved surface 116 (e.g., involute, etc.). The first curved surface 116 is contiguous with the first inlet tube 113 and the second inlet tube 114. The first curved surface 116 follows a first curvature of the first inlet tube 113 and terminates at the second inlet tube 114. The mixing housing 115 also includes a second curved surface 117 (e.g., involute, etc.). The second curved surface 117 is contiguous with the second inlet tube 114 and the first inlet tube 113. The second curved surface 117 follows a second curvature of the second inlet tube 114 and terminates at the first inlet tube 113.

As a result of this configuration of the mixing housing 115, the first portion of the exhaust gas from the first inlet tube 113 can flow along the first curved surface 116 into the mixing housing 115 and the second portion of the exhaust gas from the second inlet tube 114 can flow along the second curved surface 117 into the mixing housing 115. The flow along the first curved surface 116 creates a high shear stress along the first curved surface 116 which increases heat transfer to the reductant, thereby increasing decomposition of the reductant. Similarly, the flow along the second curved surface 117 creates a high shear stress along the second curved surface 117 which increases heat transfer to the reductant, thereby increasing decomposition of the reductant.

The first curved surface 116 and the second curved surface 117 enable the exhaust gas to rapidly change direction while minimizing pressure drop induced by the mixing housing 115 and enhancing swirling (e.g., tumbling, rotation, etc.) of the exhaust gas within the mixing housing 115. By minimizing pressure drop and enhancing swirling, the mixing housing 115 may enhance the desirability of the exhaust gas aftertreatment system 100.

This configuration of the mixing housing 115 may be beneficial in ensuring that flow of the first portion of the exhaust gas into the mixing housing 115 is approximately equal to, and therefore balanced with, flow of the second portion of the exhaust gas into the mixing housing 115. By balancing flow in this manner, desirable swirling of the exhaust gas within the mixing housing 115 can be enhanced and backpressure induced by the mixing housing 115 can be minimized, which enhances desirability of the exhaust gas aftertreatment system 100.

The mixing housing 115 is defined by a mixing housing length N. As is explained in more detail herein, the mixing housing length N can be selected such that the housing assembly 104 is tailored for a target application. In various embodiments, the mixing housing length N is approximately in a range of 25 mm to 85 mm, inclusive (e.g., 23.75 mm, 25 mm, 50 mm, 65 mm, 75 mm, 85 mm, 89.25 mm, etc.).

In various embodiments, the mixing housing 115, the first inlet tube 113, the second inlet tube 114, and the upstream housing 108 collectively define a decomposition housing space 119. The upstream housing axis λ extends through the decomposition housing space 119 (e.g., between the upstream housing 108 and the mixing housing 115, etc.). As is explained in more detail herein, the decomposition housing space 119 is configured to receive components such that the components do not substantially increase a space claim (e.g., footprint, etc.) of the exhaust gas aftertreatment system 100. As a result, the exhaust gas aftertreatment system 100 may have a smaller space claim than other systems that do not define cavities for receiving components and that therefore have a larger space claim than the exhaust gas aftertreatment system 100.

The decomposition housing space 119 is defined by a decomposition housing cavity length M. As is explained in more detail herein, the decomposition housing cavity length M can be selected such that the housing assembly 104 is tailored for a target application. In various embodiments, the decomposition housing cavity length M is approximately in a range of 0 mm to 150 mm, inclusive (e.g., 0 mm, 5 mm, 25 mm, 50 mm, 75 mm, 90.8 mm, 98.3 mm, 100 mm, 101.4 mm, 101.6 mm, 125 mm, 150 mm, 157.5 mm, etc.).

Figure 21:
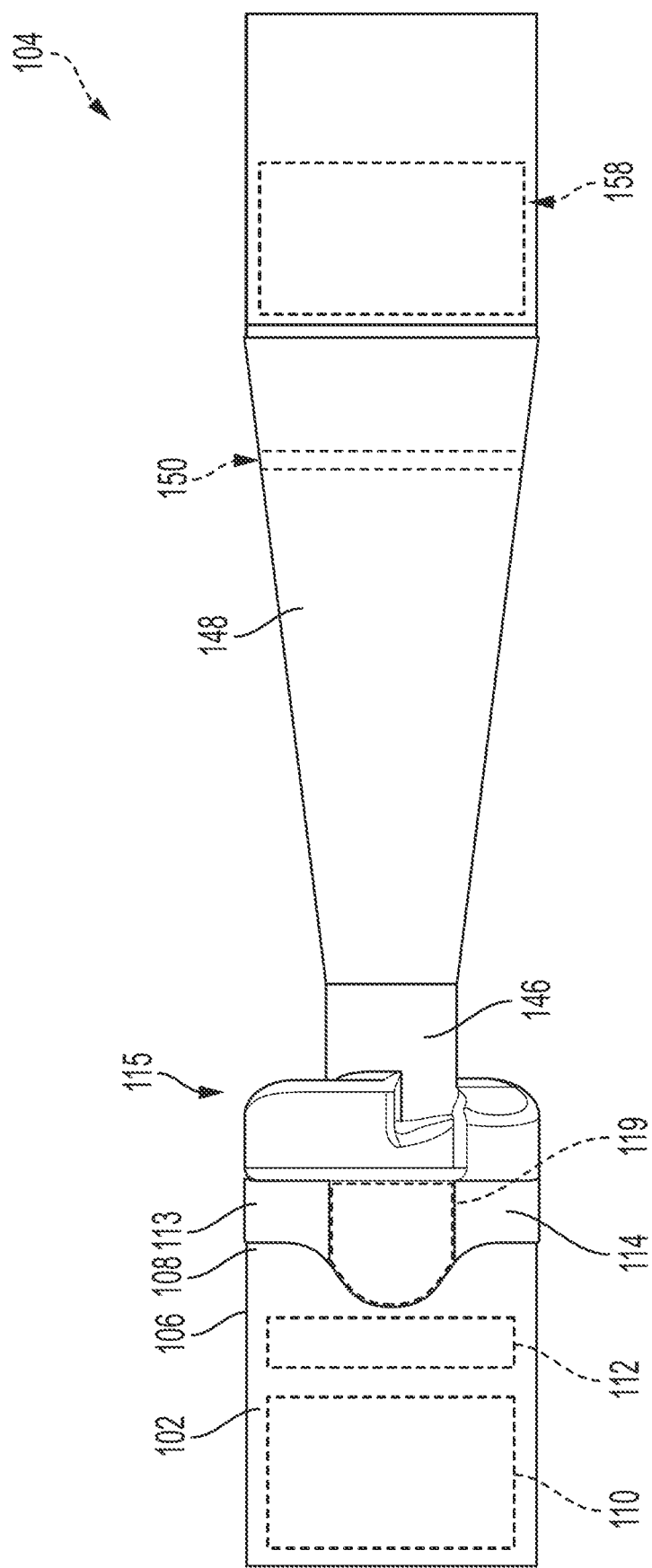
FIG. 21 is a side view of yet another example housing assembly for an exhaust gas aftertreatment system.
Figure 22:
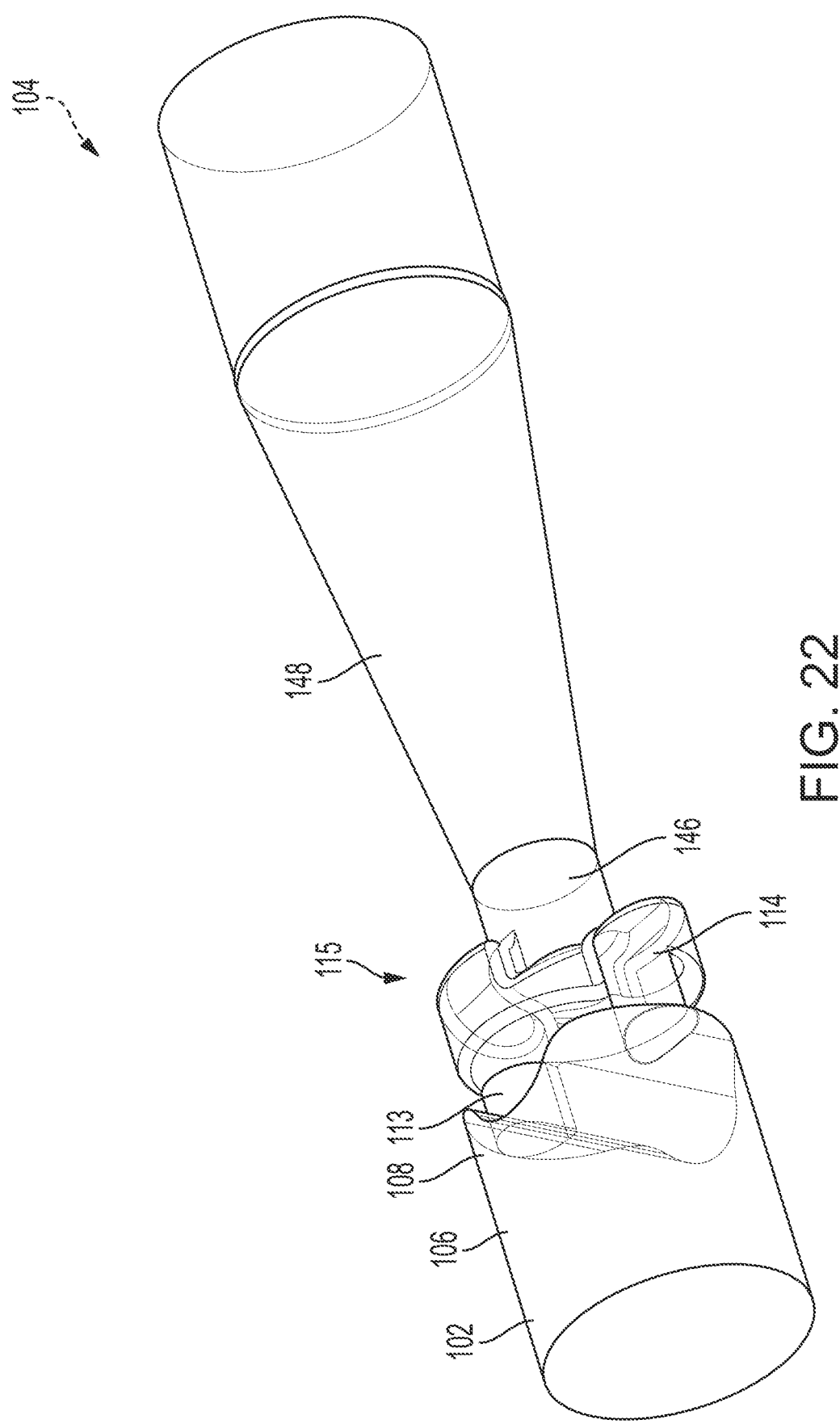
FIG. 22 is a front perspective view of the housing assembly shown in FIG. 21.
Figure 23:
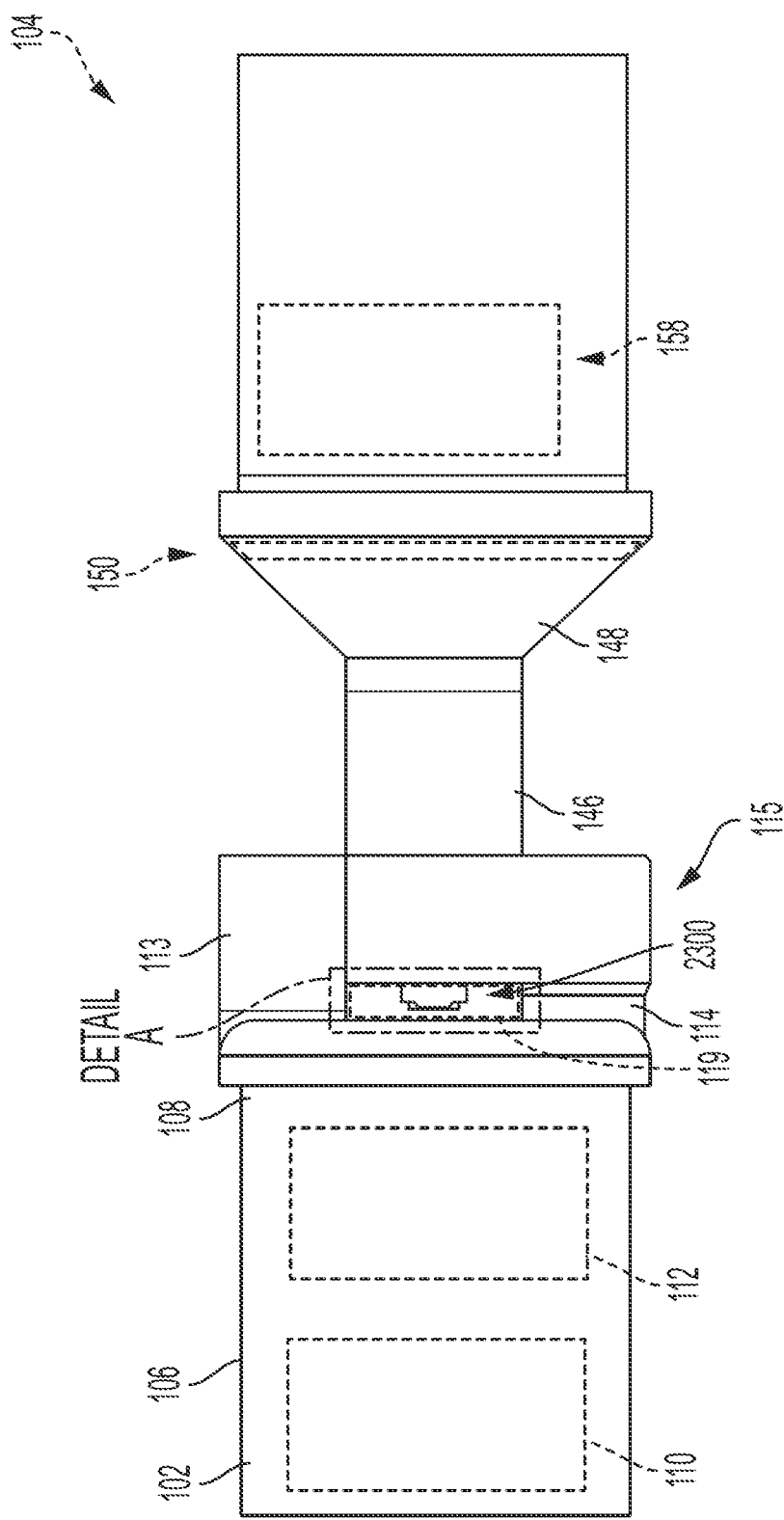
FIG. 23 is a side view of yet another example housing assembly for an exhaust gas aftertreatment system.

In some embodiments, such as is shown in FIGS. 21 and 22, the upstream housing 108 includes a concave surface in confronting relation with the mixing housing 115. As a result, a portion of the decomposition housing space 119 is convex. This convex portion of the decomposition housing space 119 may provide additional accommodation for components. Furthermore, this convex portion of the decomposition housing cavity may create a corresponding curved inner surface of the upstream housing 108 along which the exhaust gas is directed to the first inlet tube 113 and the second inlet tube 114.

The exhaust gas aftertreatment system 100 also includes a reductant delivery system 120. As is explained in more detail herein, the reductant delivery system 120 is configured to facilitate the introduction of the reductant into the exhaust gas. The reductant delivery system 120 includes a dosing module 121 (e.g., doser, etc.). The dosing module 121 is configured to facilitate passage of the reductant through the mixing housing 115 and into the mixing housing 115. As is explained in more detail herein, the dosing module 121 is configured to receive reductant, and in some embodiments, configured to receive air and reductant, and provide the reductant and/or air-reductant mixture into the mixing housing 115 to facilitate treatment of the exhaust gas. The dosing module 121 may include an insulator interposed between a portion of the dosing module 121 and the portion of the mixing housing 115 on which the dosing module 121 is mounted. In various embodiments, the dosing module 121 is coupled to the mixing housing 115.

The reductant delivery system 120 also includes a reductant source 122 (e.g., reductant tank, etc.). The reductant source 122 is configured to contain reductant. The reductant source 122 is configured to provide the reductant to the dosing module 121. The reductant source 122 may include multiple reductant sources 122 (e.g., multiple tanks connected in series or in parallel, etc.). The reductant source 122 may be, for example, a diesel exhaust fluid tank containing Adblue®.

The reductant delivery system 120 also includes a reductant pump 123 (e.g., supply unit, etc.). The reductant pump 123 is configured to receive the reductant from the reductant source 122 and to provide the reductant to the dosing module 121. The reductant pump 123 is used to pressurize the reductant from the reductant source 122 for delivery to the dosing module 121. In some embodiments, the reductant pump 123 is pressure controlled. In some embodiments, the reductant pump 123 is coupled to a chassis of a vehicle associated with the exhaust gas aftertreatment system 100.

In some embodiments, the reductant delivery system 120 also includes a reductant filter 124. The reductant filter 124 is configured to receive the reductant from the reductant source 122 and to provide the reductant to the reductant pump 123. The reductant filter 124 filters the reductant prior to the reductant being provided to internal components of the reductant pump 123. For example, the reductant filter 124 may inhibit or prevent the transmission of solids to the internal components of the reductant pump 123. In this way, the reductant filter 124 may facilitate prolonged desirable operation of the reductant pump 123.

The dosing module 121 includes an injector 126 (e.g., insertion device, etc.). The injector 126 is configured to receive the reductant from the reductant pump 123. The injector 126 is configured to dose (e.g., inject, insert, etc.) the reductant received by the dosing module 121 into the exhaust gas within the mixing housing 115 along an injector axis α. In various embodiments, the injector axis α is coincident with the upstream housing axis λ. In other embodiments, at least a portion of the injector axis a is separated from the upstream housing axis λ. For example, the injector axis α may be separated from and parallel to the upstream housing axis λ (e.g., when measured on a plane along which the injector axis a and the upstream housing axis λ both extend, etc.).

As shown in FIG. 2, the mixing housing 115 can be configured such that the injector axis α is aligned with the first catalyst member axis $J_1$ and the second catalyst member axis $J_2$ (e.g., the injector axis α, the first catalyst member axis $J_1$, and the second catalyst member axis $J_2$ are disposed along a line). This arrangement may be beneficial in ensuring that flow of the first portion of the exhaust gas into the mixing housing 115 is approximately equal to flow of the second portion of the exhaust gas into the mixing housing 115.

The mixing housing 115 may be configured such that the exhaust gas is caused to swirl around the injector axis α. For example, a center axis of the mixing housing 115 may be coincident with the injector axis α. As a result, the injector 126 may be able to provide the reductant into a relatively low pressure region of the exhaust gas (e.g., an area around which the exhaust gas swirls, etc.), which enables the reductant to be provided further downstream of the injector 126 than would otherwise be possible. In this way, the mixing housing 115 may mitigate formation of deposits (e.g., solidified reductant, crystalized reductant, etc.) that may form if the reductant is not sufficiently provided along the injector axis α.

In various embodiments, the exhaust gas aftertreatment system 100 does not include a mixer (e.g., vane plate, baffle, etc.) positioned within the mixing housing 115 and which facilitates mixing (e.g., combination, etc.) of the exhaust gas and the reductant. Instead, as outlined above, the first curved surface 116 and the second curved surface 117 facilitate mixing of the exhaust gas and the reductant and/or the air-reductant mixture from the injector 126 without any additional mixer. By facilitating swirling of the exhaust gas and mixing of the exhaust gas and the reductant or the air-reductant mixture so as to disperse the reductant within the exhaust gas downstream of the mixing housing 115. By dispersing the reductant within the exhaust gas (e.g., to obtain an increased uniformity index, etc.) using the mixing housing 115, reduction of emission of undesirable components in the exhaust gas is enhanced.

In some embodiments, the reductant delivery system 120 also includes an air pump 128 and an air source 130 (e.g., air intake, etc.). The air pump 128 is configured to receive air from the air source 130. The air pump 128 is configured to provide the air to the dosing module 121. The dosing module 121 is configured to mix the air and the reductant into an air-reductant mixture and to provide the air-reductant mixture to the injector 126 (e.g., for dosing into the exhaust gas within the mixing housing 115, etc.). The injector 126 is configured to receive the air from the air pump 128. The injector 126 is configured to dose the air-reductant mixture into the exhaust gas within the mixing housing 115. In some of these embodiments, the reductant delivery system 120 also includes an air filter 132. The air filter 132 is configured to receive the air from the air source 130 and to provide the air to the air pump 128. The air filter 132 is configured to filter the air prior to the air being provided to the air pump 128. In other embodiments, the reductant delivery system 120 does not include the air pump 128 and/or the reductant delivery system 120 does not include the air source 130. In such embodiments, the dosing module 121 is not configured to mix the reductant with air.

The exhaust gas aftertreatment system 100 also includes a controller 134 (e.g., control circuit, driver, etc.). The dosing module 121, the reductant pump 123, and the air pump 128 are electrically or communicatively coupled to the controller 134. The controller 134 is configured to control the dosing module 121 to dose the reductant and/or the air-reductant mixture into the mixing housing 115. The controller 134 may also be configured to control the reductant pump 123 and/or the air pump 128 in order to control the reductant and/or the air-reductant mixture that is dosed into the mixing housing 115.

The controller 134 includes a processing circuit 136. The processing circuit 136 includes a processor 138. The processor 138 may include a microprocessor, an application-specific integrated circuit (ASIC), a field-programmable gate array (FPGA), etc., or combinations thereof. The processing circuit 136 also a memory 140. The memory 140 may include, but is not limited to, electronic, optical, magnetic, or any other storage or transmission device capable of providing a processor, ASIC, FPGA, etc. with program instructions. This memory 140 may include a memory chip, Electrically Erasable Programmable Read-Only Memory (EEPROM), Erasable Programmable Read Only Memory (EPROM), flash memory, or any other suitable memory from which the controller 134 can read instructions. The instructions may include code from any suitable programming language. The memory 140 may include various modules that include instructions which are configured to be implemented by the processor 138.

In various embodiments, the controller 134 is configured to communicate with a central controller 142 (e.g., engine control unit (ECU), engine control module (ECM), etc.) of an internal combustion engine having the exhaust gas aftertreatment system 100. In some embodiments, the central controller 142 and the controller 134 are integrated into a single controller.

In some embodiments, the central controller 142 is communicable with a display device (e.g., screen, monitor, touch screen, heads up display (HUD), indicator light, etc.). The display device may be configured to change state in response to receiving information from the central controller 142. For example, the display device may be configured to change between a static state and an alarm state based on a communication from the central controller 142. By changing state, the display device may provide an indication to a user of a status of the reductant delivery system 120.

The housing assembly 104 also includes a decomposition housing 146 (e.g., decomposition reactor, decomposition chamber, reactor pipe, decomposition tube, reactor tube, etc.). The decomposition housing 146 is configured to receive exhaust gas from the mixing housing 115 (e.g., after the reductant has been provided into the exhaust gas by the injector 126 and the reductant and the exhaust gas have been partially mixed within the mixing housing 115, etc.). In various embodiments, the decomposition housing 146 is coupled to the mixing housing 115. For example, the decomposition housing 146 may be fastened, welded, riveted, or otherwise attached to the mixing housing 115. In other embodiments, the decomposition housing 146 is integrally formed with the mixing housing 115.

The decomposition housing 146 is centered on a decomposition housing axis U. In other words, a center point of a cross-section of the decomposition housing 146 is disposed on the first decomposition housing axis U along a length of the decomposition housing 146. The exhaust gas may be provided through the decomposition housing 146 in a direction that is parallel to, or coincident with, the decomposition housing axis U. In various embodiments, the decomposition housing axis U is coincident with the upstream housing axis λ (e.g., the decomposition housing axis U is coincident with both the upstream housing axis λ and the injector axis α, etc.). In some embodiments, the decomposition housing axis U is approximately parallel to the upstream housing axis λ (e.g., when measured on a plane along which the decomposition housing axis U and the upstream housing axis λ both extend, etc.). In some embodiments, the decomposition housing axis U is coincident with the injector axis α.

Figure 19:
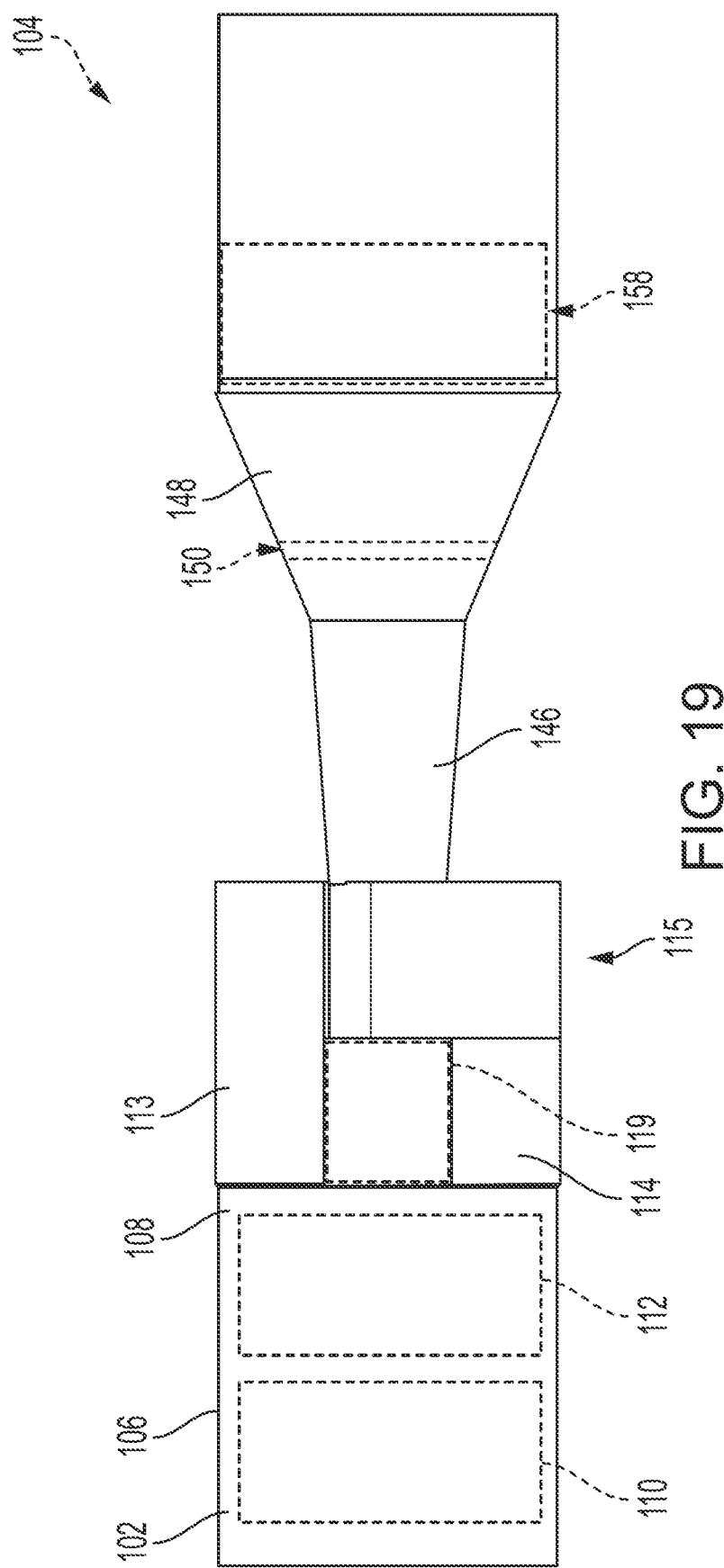
FIG. 19 is a side view of yet another example housing assembly for an exhaust gas aftertreatment system.
Figure 20:
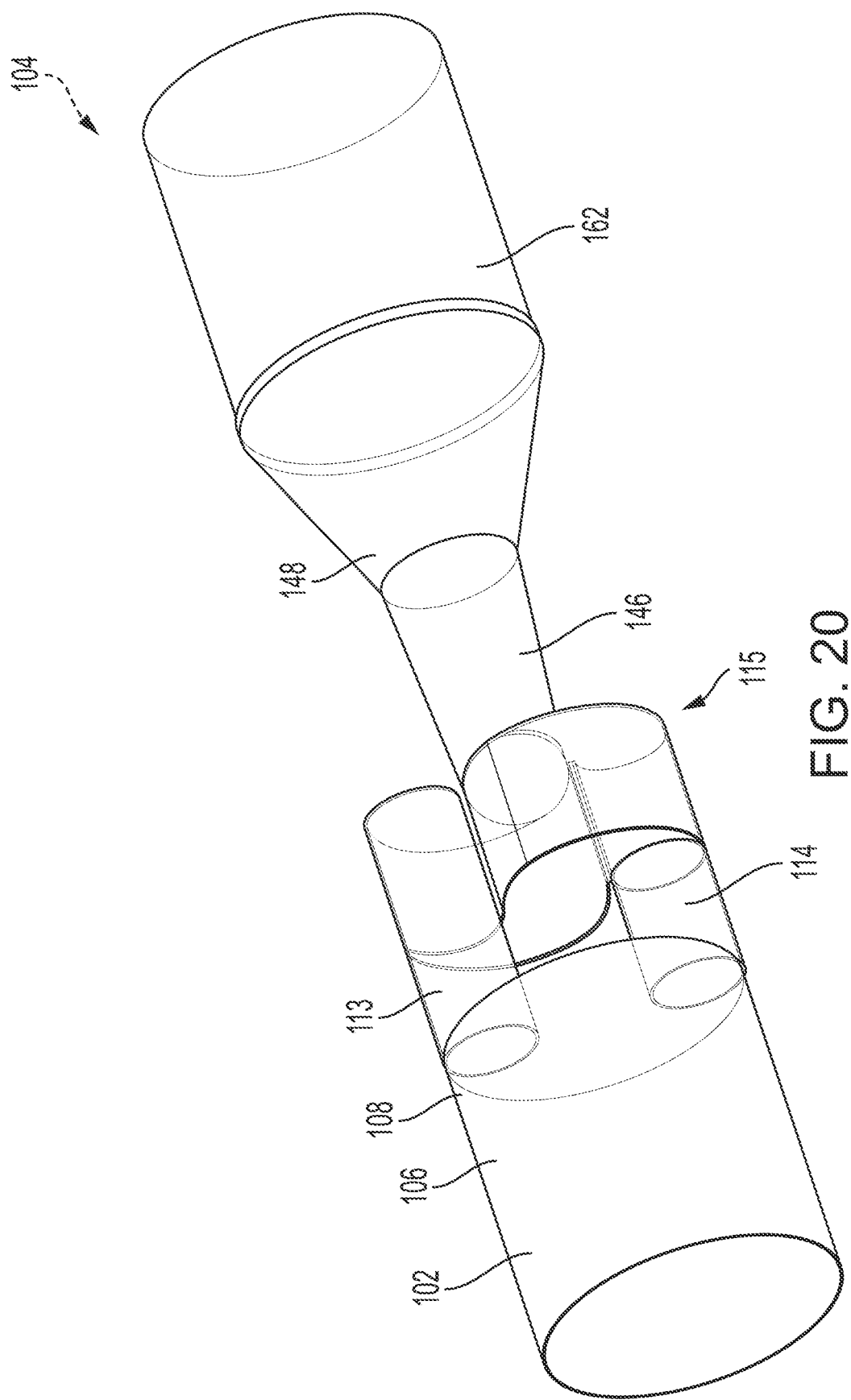
FIG. 20 is a front perspective view of the housing assembly shown in FIG. 19.

The decomposition housing 146 is defined by a decomposition housing diameter D and a decomposition housing length $L_1$. In various embodiments, the decomposition housing diameter D is approximately constant along the decomposition housing length $L_1$. As is explained in more detail herein, the decomposition housing diameter D and the decomposition housing length $L_1$ can each be selected such that the decomposition housing 146 is tailored for a target application. In some embodiments, the decomposition housing diameter D varies along the decomposition housing length $L_1$. For example, the decomposition housing diameter may gradually increase along the decomposition housing length $L_1$, as shown in FIGS. 19 and 20.

In various embodiments, the decomposition housing diameter D is approximately in a range of 50 mm to 150 mm, inclusive (e.g., 47.5 mm, 50 mm, 75 mm, 90.8 mm, 98.3 mm, 100 mm, 101.4 mm, 101.6 mm, 125 mm, 150 mm, 157.5 mm, etc.). In some embodiments, the decomposition housing diameter D is approximately in a range of 95 mm to 105 mm, inclusive (e.g., 90.25 mm, 95 mm, 98 mm, 100 mm, 102 mm, 105 mm, 110.25 mm, etc.).

In various embodiments, the decomposition housing length $L_1$ is approximately in a range of 10 mm to 250 mm, inclusive (e.g., 9.5 mm, 10 mm, 20 mm, 60 mm, 75 mm, 100 mm, 112 mm, 120 mm, 125 mm, 180 mm, 200 mm, 220 mm, 250 mm, 262.5 mm, etc.). In some embodiments, the decomposition housing length $L_1$ is approximately in a range of 20 mm to 220 mm, inclusive (e.g., 19 mm, 20 mm, 60 mm, 98 mm, 100 mm, 102 mm, 118 mm, 120 mm, 125 mm, 125.2 mm, 127 mm, 177.3 mm, 180 mm, 200 mm, 220 mm, 231 mm, etc.). In some embodiments, the decomposition housing length $L_1$ is approximately equal to 306.2 mm.

The decomposition housing 146 is defined by a ratio A of the decomposition housing length $L_1$ relative to the decomposition housing diameter D. In various embodiments, the ratio A is approximately in a range of 0.1 to 2.3, inclusive (e.g., 0.095, 0.1, 0.2, 0.41, 0.61, 0.81, 1, 1.02, 1.22, 1.42, 1.63, 1.83, 2.03, 2.24, 2.3, 2.415, etc.). In some embodiments, the ratio A is approximately in a range of 0.2 to 2.24, inclusive (e.g., 0.19, 0.2, 0.41, 0.61, 0.81, 1, 1.02, 1.22, 1.42, 1.63, 1.83, 2.03, 2.24, 2.352, etc.).

The housing assembly 104 also includes a divergent housing 148 (e.g., dispersion housing, etc.). The divergent housing 148 is located downstream of the decomposition housing 146 and configured to receive exhaust gas from the decomposition housing 146. In various embodiments, the divergent housing 148 is coupled to the decomposition housing 146. For example, the divergent housing 148 may be fastened, welded, riveted, or otherwise attached to the decomposition housing 146. In other embodiments, the divergent housing 148 is integrally formed with the decomposition housing 146.

As is explained in more detail herein, the divergent housing 148 facilitates gradual expansion of a cross-sectional area of a flow of the exhaust gas so as to facilitate desirable treatment of the exhaust gas downstream of the divergent housing 148. An inner surface of the divergent housing 148 is angularly separated from an inner surface of the decomposition housing 146 by an angular separation τ. In various embodiments, the angular separation τ is approximately in a range of 5 degrees(°) to 70°, inclusive (e.g., 4.75°, 5°, 7°, 10°, 16.36°, 16.82°, 17.35°, 17.81°, 18.36°, 18.8°, 20.5°, 22.5°, 22.51°, 24.94°, 27.91°, 31.6°, 36.27°, 36.9°, 37°, 42.27°, 49°, 50.04°, 60.09°, 70°, 73.5°, etc.). In some embodiments, the angular separation τ is approximately in a range of 16° to 60°, inclusive (e.g., 15.2°, 16°, 16.36°, 16.82°, 17.35°, 17.81°, 18.36°, 18.8°, 20.5°, 22.5°, 22.51°, 24.94°, 27.91°, 31.6°, 36.27°, 36.9°, 42.27°, 50°, 50.04°, 60.09°, 60°, 63°, etc.).

The divergent housing 148 is centered on a divergent housing axis V. In other words, a center point of a cross-section of the divergent housing 148 is disposed on the divergent housing axis V along a divergent housing length $L_2$ of the divergent housing 148. The exhaust gas may be provided through the divergent housing 148 in a direction that is parallel to, or coincident with, the divergent housing axis V. In various embodiments, the divergent housing axis V is coincident with the upstream housing axis $\lambda$ (e.g., the divergent housing axis V is coincident with both the upstream housing axis $\lambda$ and the injector axis $\alpha$, etc.). In some embodiments, the divergent housing axis V is approximately parallel to the upstream housing axis $\lambda$ (e.g., when measured on a plane along which the divergent housing axis V and the upstream housing axis $\lambda$ both extend, etc.). In some embodiments, the divergent housing axis V is coincident with the injector axis $\alpha$.

The divergent housing 148 has a diameter that increases along the divergent housing length $L_2$. As a result, the divergent housing 148 may be frustoconical in shape. In various embodiments, the divergent housing length $L_2$ is approximately in a range of 60 mm to 550 mm, inclusive (e.g., 57 mm, 60 mm, 75 mm, 100 mm, 125 mm, 250 mm, 300 mm, 550 mm, 577.5 mm, etc.).

In various embodiments, the housing assembly 104 also includes an annular flange 150 (e.g., perforated plate, etc.). The annular flange is shown in greater detail in FIG. 6. The annular flange 150 coupled to and disposed within the divergent housing 148 and extends across an inner surface of the divergent housing 148. The annular flange 150 is configured to facilitate straightening of a flow of the exhaust gas upstream of a catalyst member, as is described in more detail herein. By straightening the flow of the exhaust gas, the catalyst member may more desirably treat the exhaust gas, which may make the exhaust gas aftertreatment system 100 more desirable. In other embodiments, the housing assembly 104 does not include the annular flange 150. In such embodiments, a length of the divergent housing 148 may be reduced compared to embodiments where the housing assembly 104 includes the annular flange 150.

In various embodiments, the diameter of the annular flange 150 is approximately in a range of a product of 1.2 and decomposition housing diameter D and a product of 2.5 and the decomposition housing diameter D. In some embodiments, the diameter of the annular flange 150 is approximately in a range of 100 mm to 200 mm, inclusive (e.g., 95 mm, 100 mm, 130 mm, 140 mm, 150 mm, 175 mm, 200 mm, 210 mm, etc.).

In various embodiments, the annular flange 150 includes a central opening 152. The annular flange 150 surrounds the central opening 152, and the central opening 152 facilitates flow of the exhaust gas through the annular flange 150. In some embodiments, the divergent housing axis V extends through the central opening 152. In some embodiments, the injector axis $\alpha$ extends through the central opening 152. In some embodiments, the central opening 152 is centered on the divergent housing axis V. In some embodiments, the central opening 152 is offset from the divergent housing axis V. Further, the central opening may define a central opening diameter. The central opening diameter may vary. In various embodiments, the central opening diameter is approximately in a range of a product of 0.7 and decomposition housing diameter D and a product of 1.5 and the decomposition housing diameter D. In some embodiments, the central opening diameter is approximately in a range of 50 mm to 150 mm, inclusive (e.g., 47.5 mm, 50 mm, 70 mm, 90 mm, 100 mm, 125 mm, 150 mm, 157.5 mm, etc.).

Figure 6:
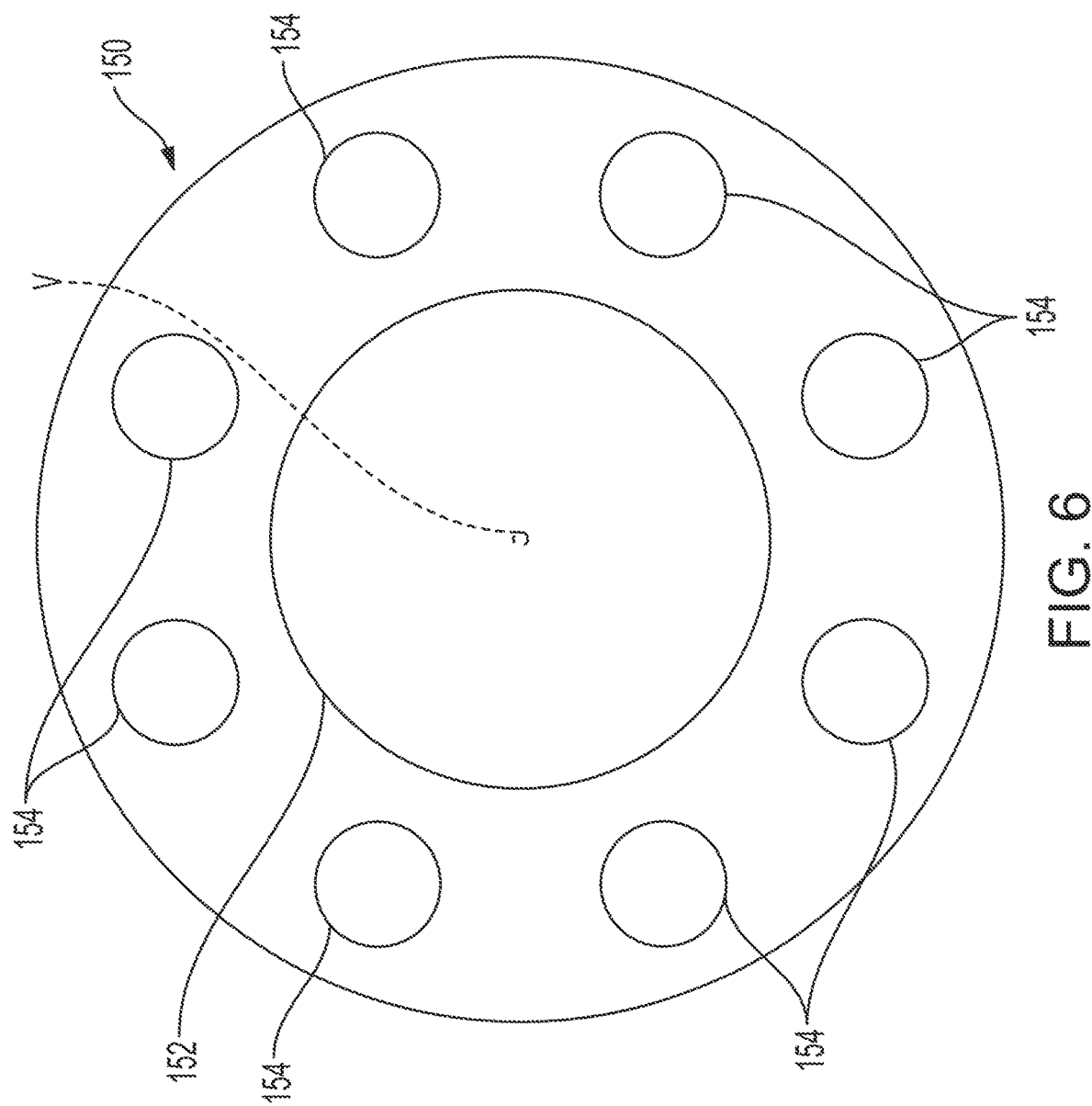
FIG. 6 is a front view of an annular flange for an exhaust gas aftertreatment system.
Figure 7:
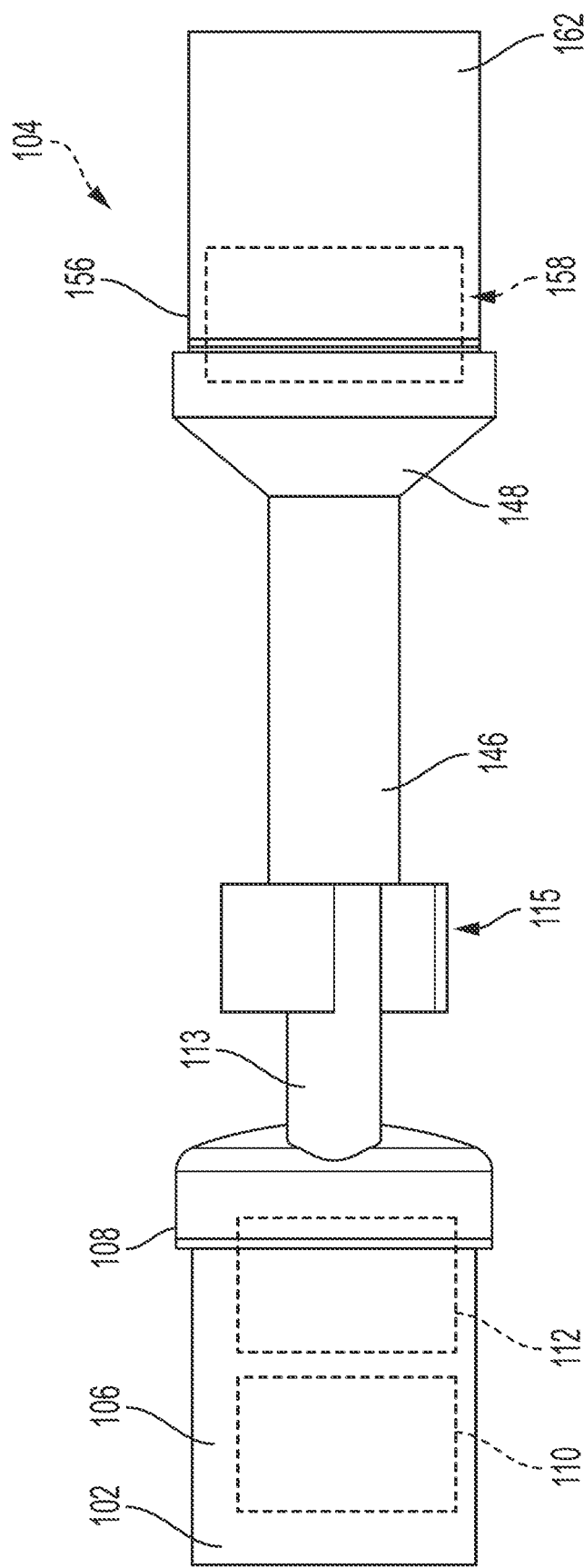
FIG. 7 is a side view of another example housing assembly for an exhaust gas aftertreatment system.
Figure 8:
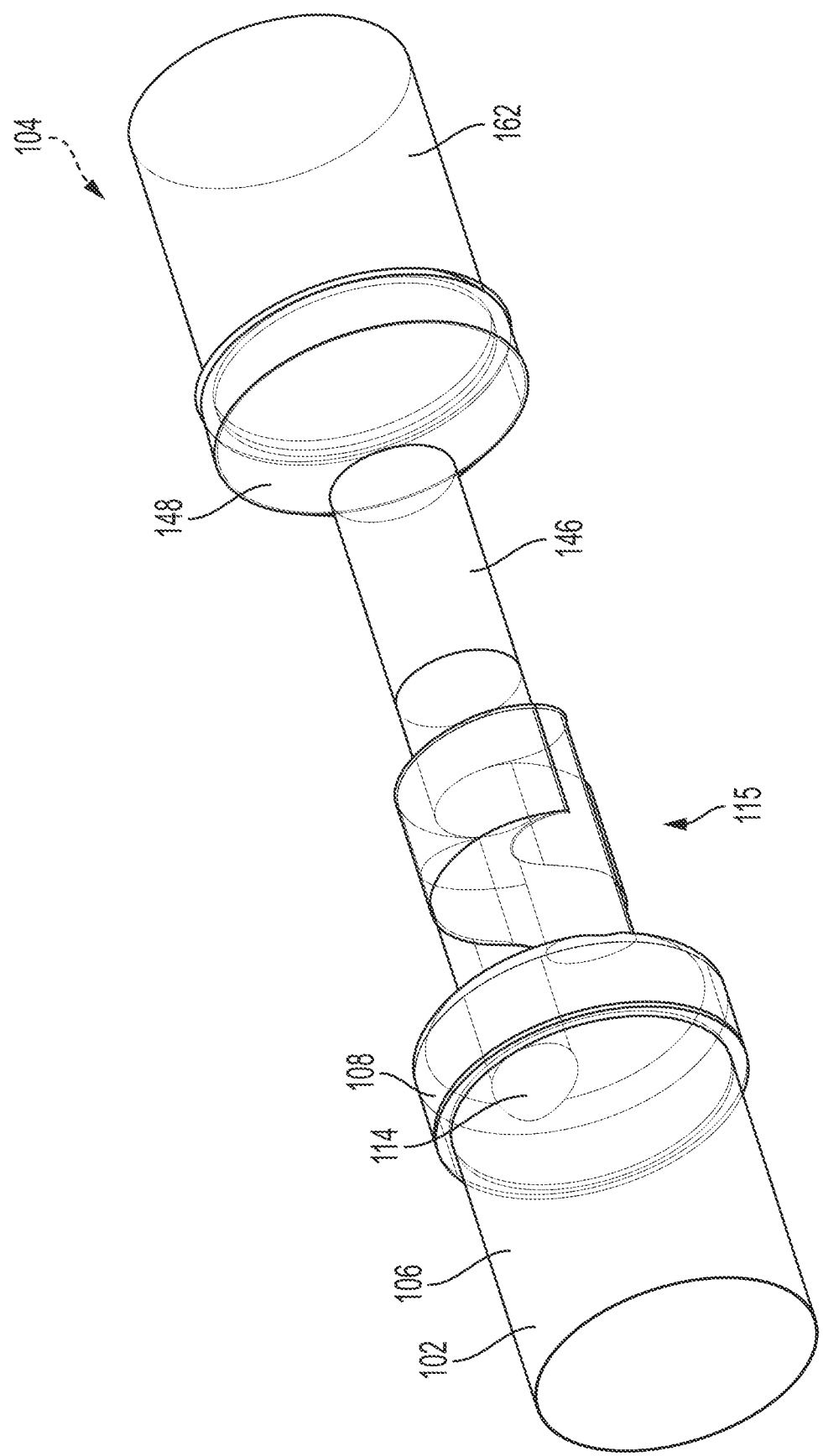
FIG. 8 is a front perspective view of the housing assembly shown in FIG. 7.
Figure 9:
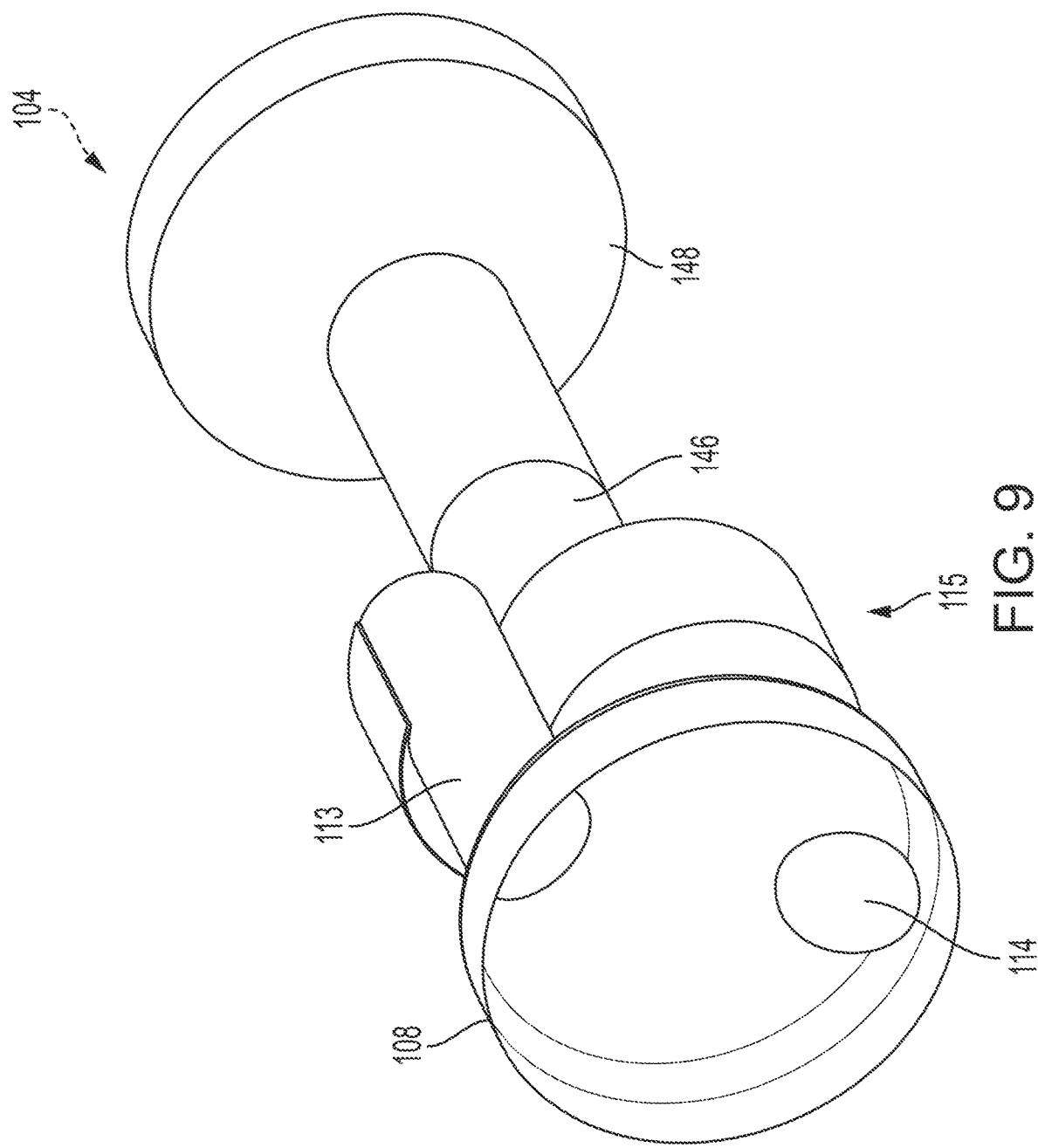
FIG. 9 is a front perspective view of yet another example housing assembly for an exhaust gas aftertreatment system.
Figure 10:
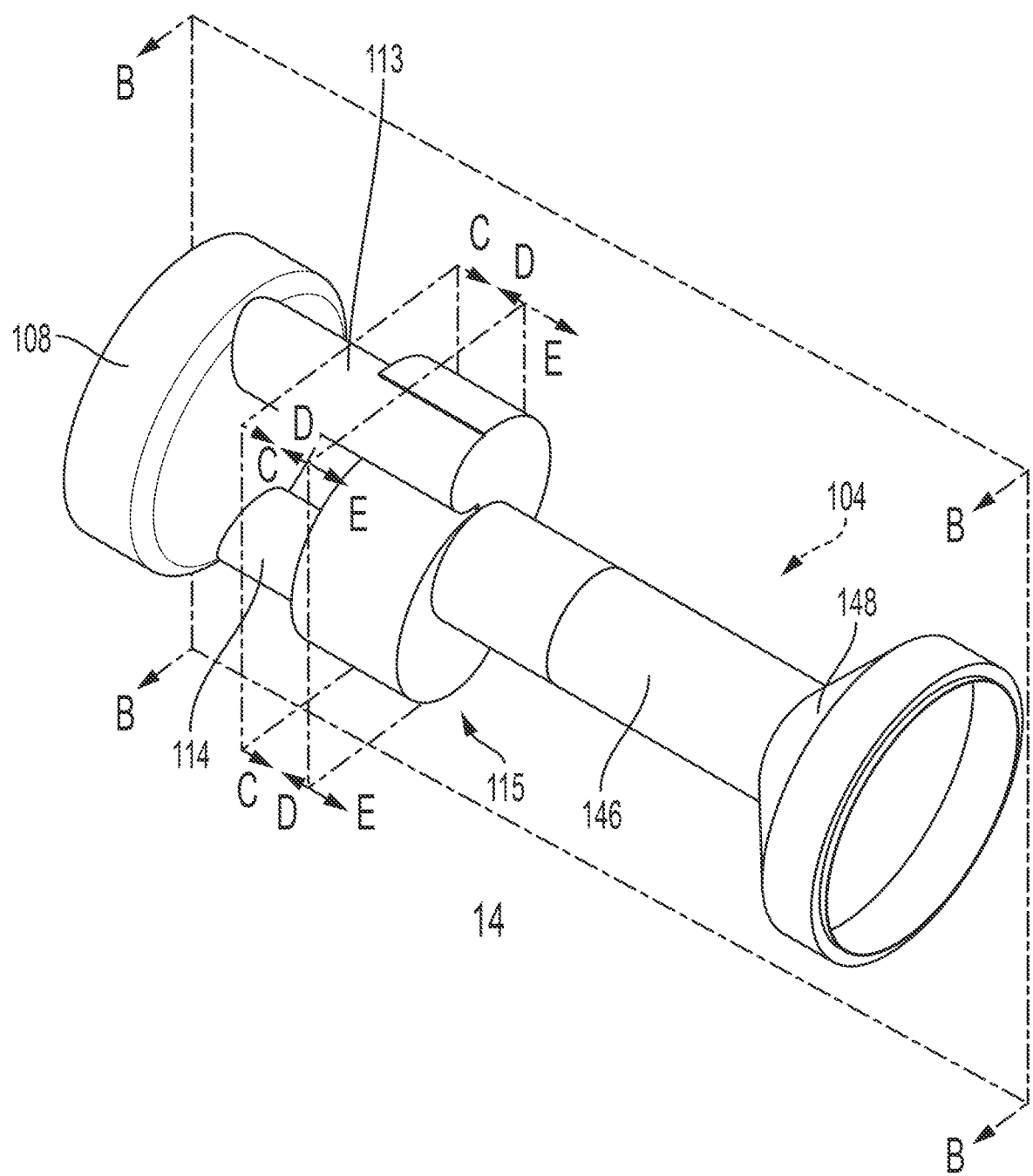
FIG. 10 is a rear perspective view of the housing assembly shown in FIG. 9.
Figure 11:
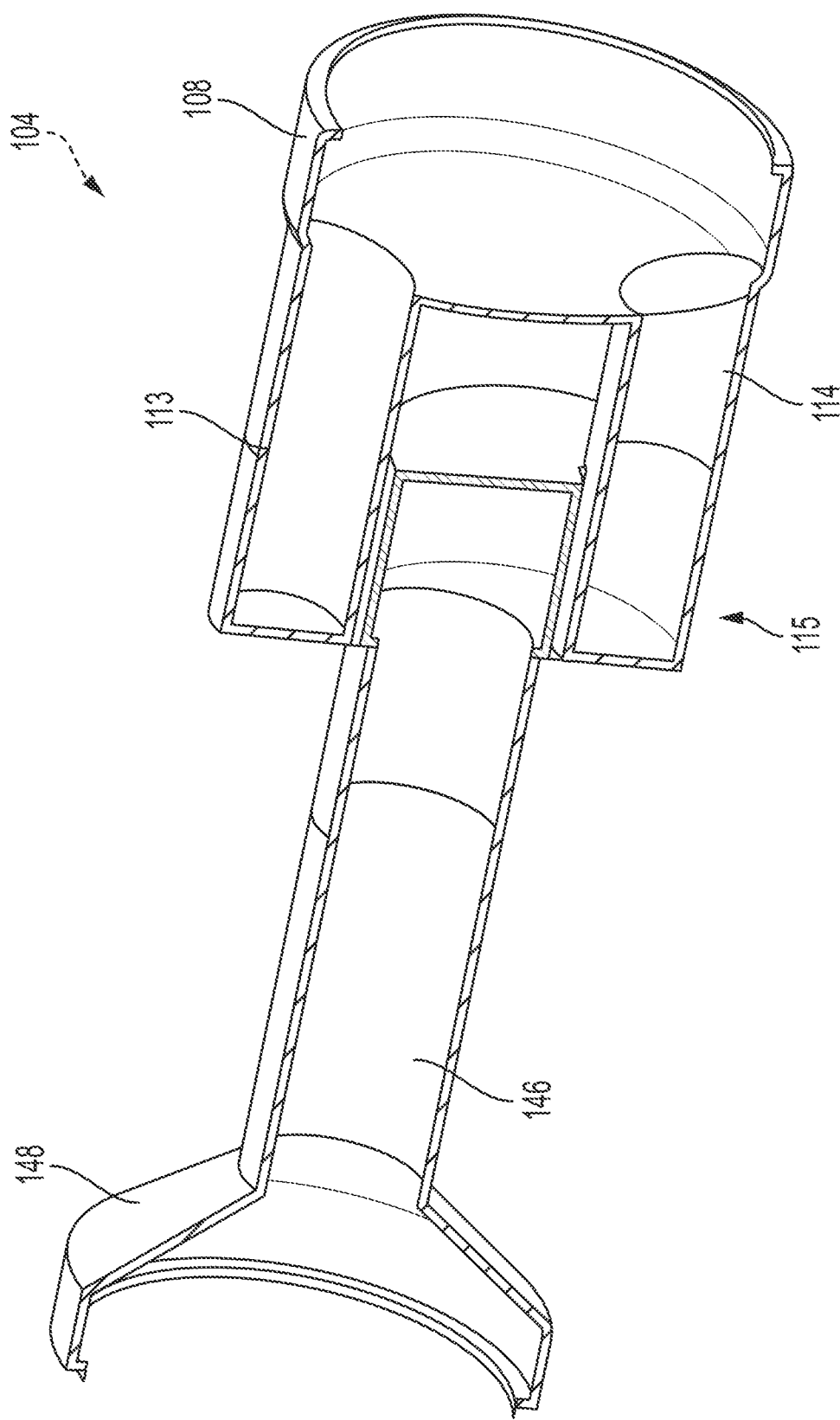
FIG. 11 is a cross-sectional view of the housing assembly shown in FIG. 9 taken along plane B-B in FIG. 10.
Figure 12:
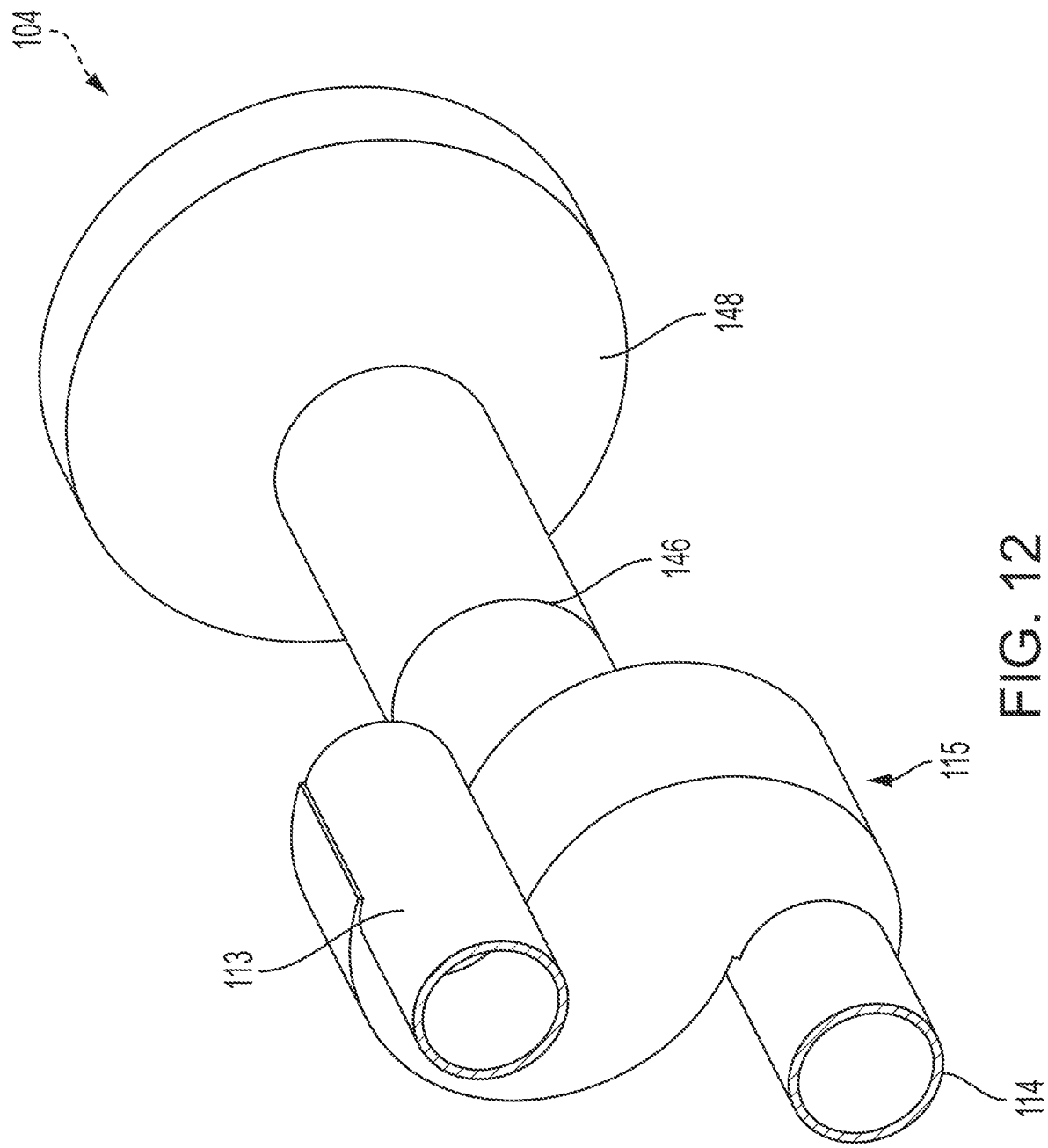
FIG. 12 is a cross-sectional view of the housing assembly shown in FIG. 9 taken along plane C-C in FIG. 10.
Figure 13:
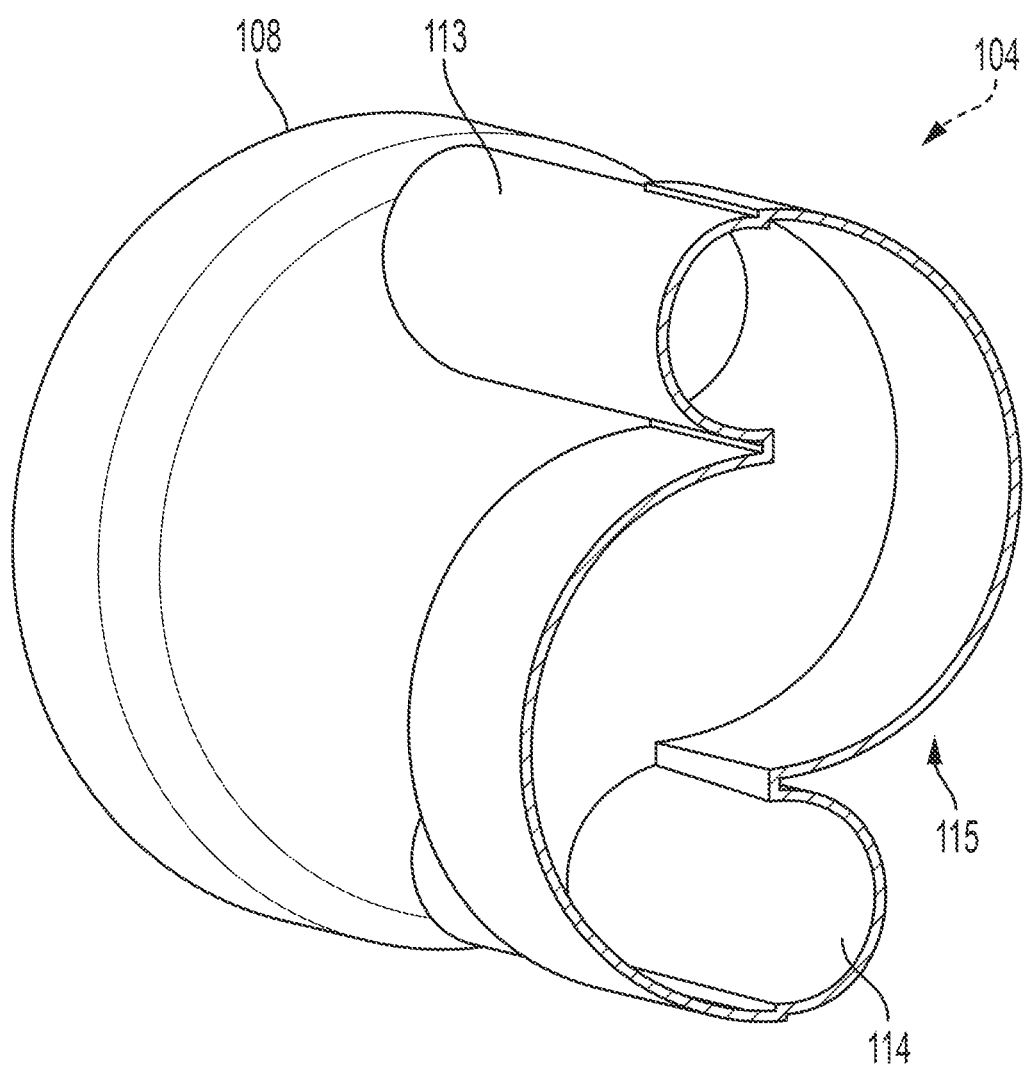
FIG. 13 is a cross-sectional view of the housing assembly shown in FIG. 9 taken along plane D-D in FIG. 10.
Figure 14:
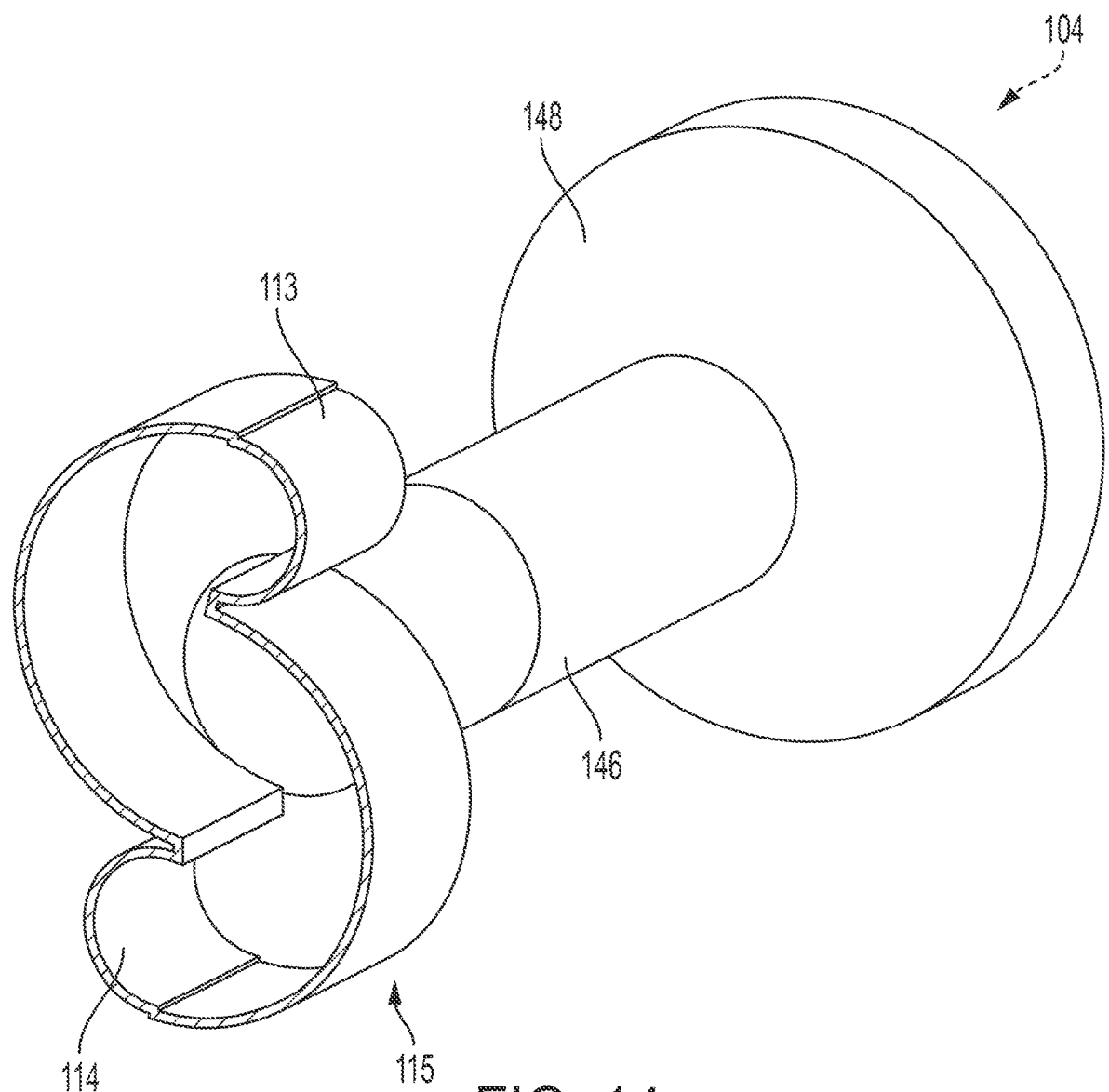
FIG. 14 is a cross-sectional view of the housing assembly shown in FIG. 9 taken along plane E-E in FIG. 10.
Figure 15:
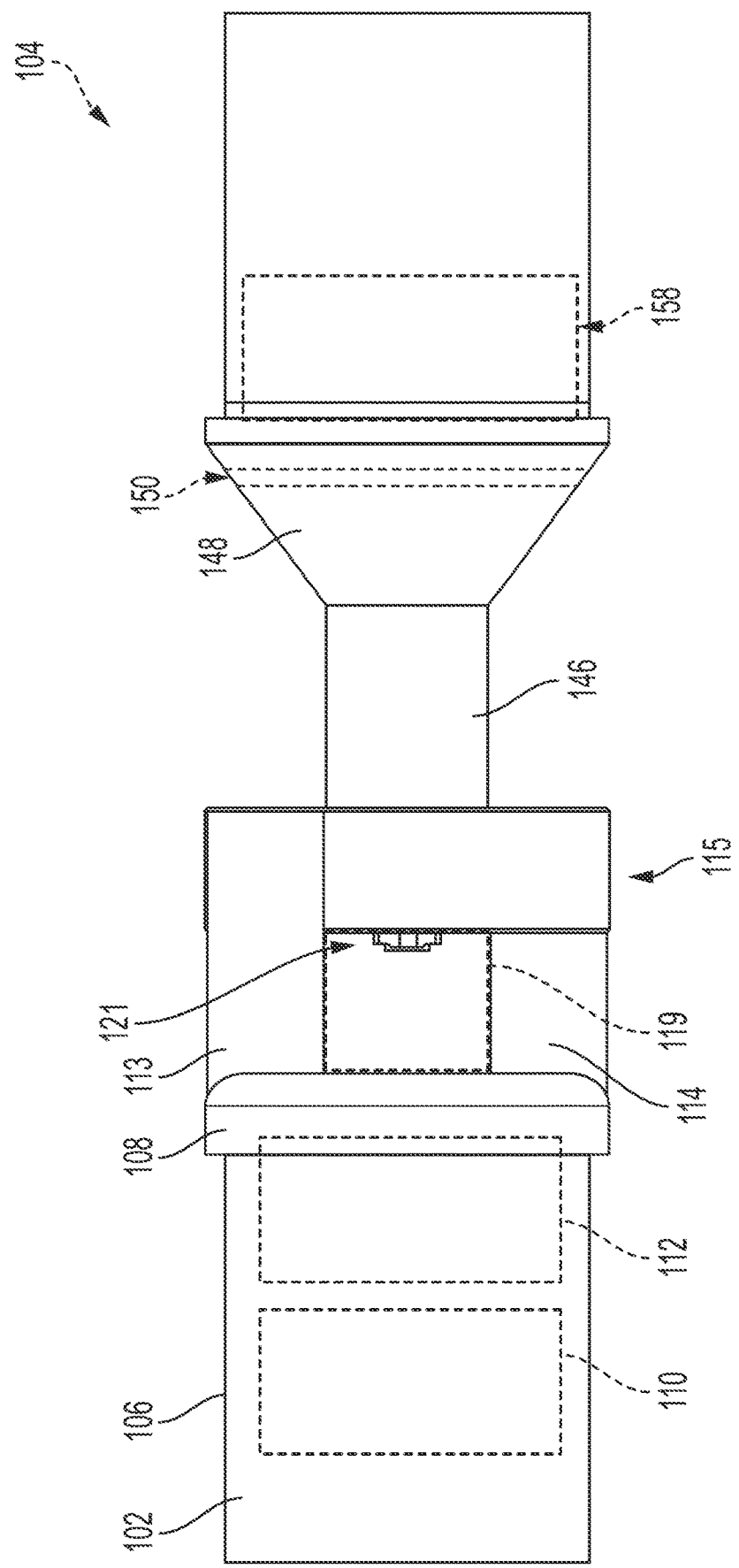
FIG. 15 is a side view of yet another example housing assembly for an exhaust gas aftertreatment system.
Figure 16:
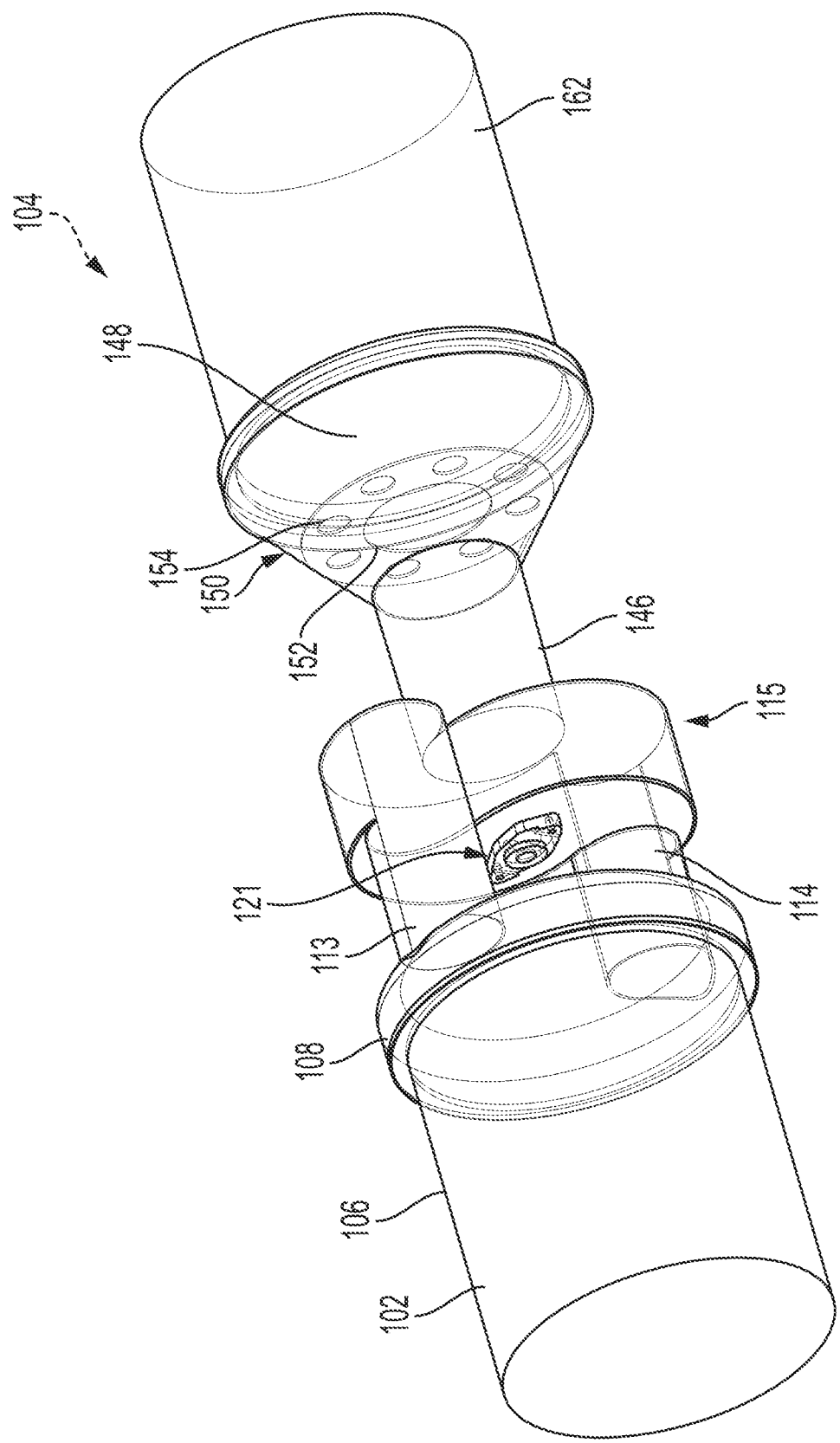
FIG. 16 is a front perspective view of the housing assembly shown in FIG. 15.
Figure 17:
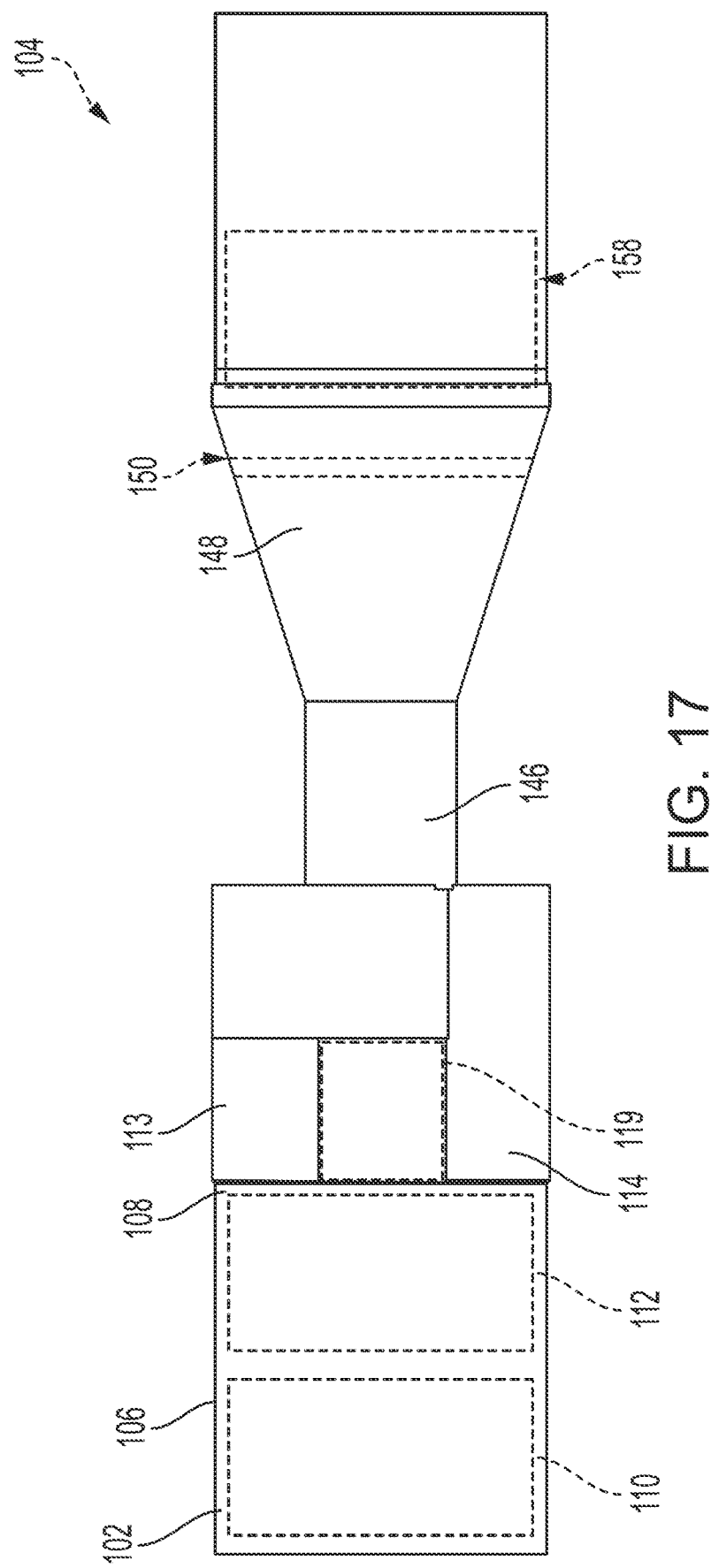
FIG. 17 is a side view of yet another example housing assembly for an exhaust gas aftertreatment system.
Figure 18:
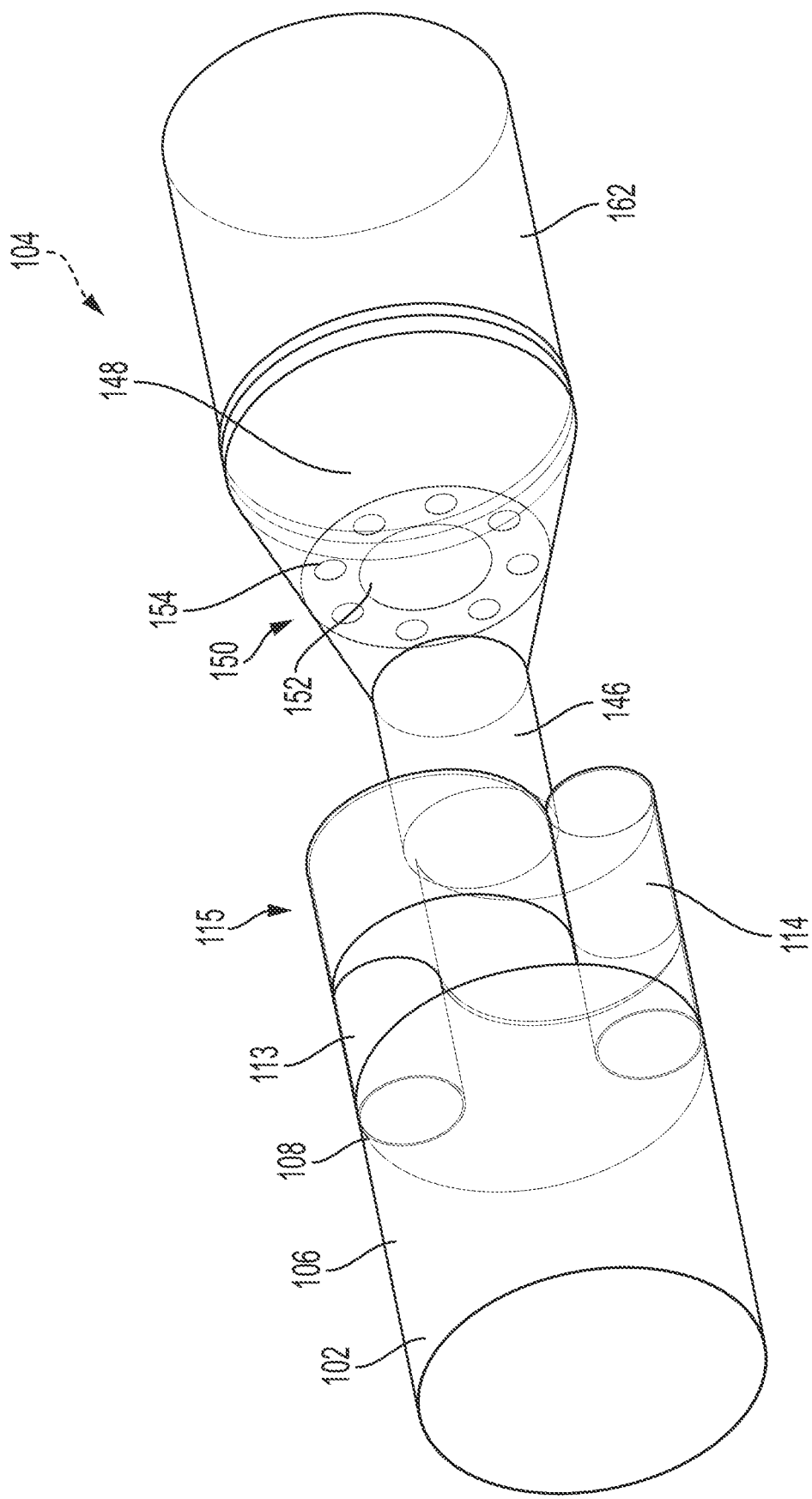
FIG. 18 is a front perspective view of the housing assembly shown in FIG. 17.

In various embodiments, the annular flange 150 may include a plurality of apertures 154. Each of the apertures 154 is configured to facilitate flow of the exhaust gas through the annular flange 150. The apertures 154 may be disposed along the annular flange 150 around the central opening 152, as shown in FIG. 6. The apertures 154 may vary in number and/or diameter. The variation in the apertures 154 may correspond with the central opening diameter. For instance, a smaller central opening diameter may allow for a greater number of apertures 154 and/or the apertures 154 to have larger diameter(s). In some embodiments, for example as shown in FIG. 6, the annular flange 150 includes eight of the apertures 154 evenly spaced around a center point of the annular flange 150. In some embodiments, the apertures 154 may each be formed of a large number of perforations rather than of a single hole. The apertures 154 may be circular, square, hexagonal, triangular, or otherwise similar shaped such that the annular flange 150 is tailored for a target application. The apertures 154 facilitate smoothing of a flow of the exhaust gas prior to the exhaust gas exiting the divergent housing 148. In various embodiments, the diameter of each of the apertures 154 is approximately in a range of a product of 0.01 and decomposition housing diameter D and a product of 0.5 and the decomposition housing diameter D. In some embodiments, the diameter of each of the apertures 154 is approximately in a range of 1 mm to 40 mm, inclusive (e.g., 0.95 mm, 1 mm, 10 mm, 20 mm, 22.5 mm, 30 mm, 40 mm, 42 mm, etc.). In some embodiments, the annular flange 150 does not include any of the apertures 154 and instead only includes the central opening 152. In other embodiments, the annular flange 150 does not include the central opening 152 and instead only includes the apertures 154.

The annular flange 150 is located at an annular flange length $L_3$ from the decomposition housing 146. In various embodiments, the annular flange length $L_3$ is approximately in a range of a product of 0.3 and divergent housing length $L_2$ and a product of 0.8 and the divergent housing length $L_2$. In some embodiments, the annular flange length $L_3$ is approximately in a range of 50 mm to 300 mm, inclusive (e.g., 47.5 mm, 50 mm, 100 mm, 153 mm, 200 mm, 250 mm, 300 mm, 315 mm, etc.).

The housing assembly 104 also includes a catalyst member housing 156 (e.g., body, etc.). The catalyst member housing 156 is located downstream of the divergent housing 148 and configured to receive exhaust gas from the divergent housing 148. In various embodiments, the catalyst member housing 156 is coupled to the divergent housing 148. For example, the catalyst member housing 156 may be fastened, welded, riveted, or otherwise attached to the divergent housing 148. In other embodiments, the catalyst member housing 156 is integrally formed with the divergent housing 148.

In various embodiments, the catalyst member housing 156 is centered on a catalyst member housing axis C. In other words, a center point of a cross-section of the catalyst member housing 156 is disposed on the catalyst member housing axis C along a length of the catalyst member housing 156. The exhaust gas may be provided through the catalyst member housing 156 in a direction that is parallel to, or coincident with, the catalyst member housing axis C.

In various embodiments, the catalyst member housing axis C is coincident with the upstream housing axis $\lambda$ (e.g., the catalyst member housing axis C is coincident with both the upstream housing axis $\lambda$ and the injector axis $\alpha$, etc.). In some embodiments, the catalyst member housing axis C is approximately parallel to the upstream housing axis λ (e.g., when measured on a plane along which the catalyst member housing axis C and the upstream housing axis λ both extend, etc.). In some embodiments, the catalyst member housing axis C is coincident with the injector axis α.

The housing assembly 104 is defined by an introduction length P from an inlet of the first inlet tube 113 to an outlet of the divergent housing 148 as measured along the decomposition housing axis U. In various embodiments, the divergent housing length $L_2$ is approximately in a range of 200 mm to 500 mm, inclusive (e.g., 190 mm, 200 mm, 293 mm, 345 mm, 461.9 mm, 500 mm, 525 mm, etc.).

The exhaust gas aftertreatment system 100 also includes a catalyst member 158 (e.g., selective catalytic reduction (SCR) catalyst member, etc.). The catalyst member 158 is configured to receive, treat, and output the exhaust gas output by the divergent housing 148. At least a portion of the catalyst member 158 is positioned within the catalyst member housing 156. As is explained in more detail herein, the catalyst member 158 is configured to cause decomposition of components of the exhaust gas using the reductant (e.g., via catalytic reactions, etc.). Specifically, the reductant that has been provided into the exhaust gas by the injector 126 undergoes the processes of evaporation, thermolysis, and hydrolysis to form non-$NO_x$ emissions within the mixing housing 115, the decomposition housing 146, the catalyst member housing 156, the catalyst member 158, and/or the housing assembly 104. The catalyst member 158 is configured to assist in the reduction of $NO_x$ emissions by accelerating a $NO_x$ reduction process between the reductant and the $NO_x$ of the exhaust gas into diatomic nitrogen, water, and/or carbon dioxide.

In various embodiments, the catalyst member 158 is centered on a catalyst member axis M. In other words, a center point of a cross-section of the catalyst member 158 is disposed on the catalyst member axis M along a length of the catalyst member 158. The exhaust gas may be provided through the catalyst member 158 in a direction that is parallel to, or coincident with, the catalyst member axis M. In various embodiments, the catalyst member axis M is coincident with the upstream housing axis λ (e.g., the catalyst member axis M is coincident with both the upstream housing axis λ and the injector axis α, etc.). In some embodiments, the catalyst member axis M is approximately parallel to the upstream housing axis λ (e.g., when measured on a plane along which the catalyst member axis M and the upstream housing axis λ both extend, etc.). In some embodiments, the catalyst member axis M is coincident with the injector axis α.

The catalyst member 158 includes a catalyst substrate 160 (e.g., catalyst metals, etc.). The catalyst substrate 160 may include, for example, platinum, rhodium, palladium, or other similar materials. The catalyst substrate 160 is configured to assist in the reduction of $NO_x$ emissions by accelerating a $NO_x$ reduction process between the reductant and the $NO_x$ of the exhaust gas into diatomic nitrogen, water, and/or carbon dioxide. In some embodiments, the catalyst substrate 160 is a ceramic catalyst material. In some embodiments, the catalyst substrate 160 is an extruded catalyst material.

The catalyst substrate 160 is located at a catalyst substrate length $L_4$ from the divergent housing 148. In various embodiments, the catalyst substrate length $L_4$ is approximately in a range of 20 mm to 80 mm, inclusive (e.g., 19 mm, 20 mm, 30 mm, 37.5 mm, 45.8 mm, 52.5 mm, 60 mm, 80 mm, 84 mm, etc.). In some embodiments, the catalyst substrate length $L_4$ is approximately in a range of 30 mm to 60 mm, inclusive (e.g., 28.5 mm, 30 mm, 37.5 mm, 45.8 mm, 52.5 mm, 60 mm, 63 mm, etc.).

The exhaust gas aftertreatment system 100 also includes a downstream exhaust gas conduit 162 (e.g., line, pipe, etc.). The downstream exhaust gas conduit 162 is downstream of the catalyst member housing 156 and is configured to receive the exhaust gas from the catalyst member housing 156. In some embodiments, the downstream exhaust gas conduit 162 is coupled to the catalyst member housing 156. In other embodiments, the downstream exhaust gas conduit 162 is integrally formed with the catalyst member housing 156.

The exhaust gas aftertreatment system 100 also includes an outlet sensor 164 (e.g., probe, etc.). The outlet sensor 164 is exposed to the exhaust gas within the downstream exhaust gas conduit 162. The outlet sensor 164 is electrically or communicatively coupled to the controller 134. The controller 134 is configured to receive a signal from the outlet sensor 164 and determine, based on the signal, a value (e.g., reading, etc.) of a property (e.g., $NO_x$ concentration, $O_2$ concentration, temperature, pressure, quality, velocity, etc.) of the exhaust gas within the downstream exhaust gas conduit 162. The controller 134 may then control operation of the exhaust gas aftertreatment system 100 based on the value of the property. For example, the controller 134 may compare the value of the property to a threshold (e.g., maximum desirable amount of the property, minimum desirable amount of the property, etc.) and then control operation of the exhaust gas aftertreatment system 100 based on the comparison. In some applications, the controller 134 control operation of the exhaust gas aftertreatment system 100 by causing the dosing module 121 to dose additional reductant into the mixing housing 115.

As discussed above, the exhaust gas aftertreatment system 100 can be variously configured so as to be tailored for a target application. Table 1, below, provides several combinations of some of the aforementioned dimensions.

TABLE 1

Example combinations of some dimensions of the exhaust gas aftertreatment system 100.

| Example | L1 [mm] | L4 [mm] | Δ [ ] | D [mm] | τ [°] |
|---|---|---|---|---|---|
| 1 | 40 | 45.8 | 0.41 | 97.5609756 | 18.8 |
| 2 | 60 | 45.8 | 0.61 | 98.3606557 | 20.5 |
| 3 | 80 | 45.8 | 0.81 | 98.7654321 | 22.51 |
| 4 | 100 | 45.8 | 1.02 | 98.0392157 | 24.94 |
| 5 | 120 | 45.8 | 1.22 | 98.3606557 | 27.91 |
| 6 | 140 | 45.8 | 1.42 | 98.5915493 | 31.6 |
| 7 | 160 | 45.8 | 1.63 | 98.1595092 | 36.27 |
| 8 | 180 | 45.8 | 1.83 | 98.3606557 | 42.27 |
| 9 | 200 | 45.8 | 2.03 | 98.5221675 | 50.04 |
| 10 | 220 | 45.8 | 2.24 | 98.2142857 | 60.09 |
| 11 | 20 | 30 | 0.2 | 100 | 16.36 |
| 12 | 20 | 37.5 | 0.2 | 100 | 16.82 |
| 13 | 20 | 52.5 | 0.2 | 100 | 17.81 |
| 14 | 20 | 60 | 0.2 | 100 | 18.36 |

While the exhaust gas aftertreatment system 100 has been shown and described in the context of use with a diesel internal combustion engine, it is understood that the exhaust gas aftertreatment system 100 may be used with other internal combustion engines, such as gasoline internal combustion engines, hybrid internal combustion engines, propane internal combustion engines, dual-fuel internal combustion engines, and other similar internal combustion engines.

While the reductant delivery system 120 has been shown and described in the context of use with a reductant, it is understood that the reductant delivery system 120 may be used instead with a hydrocarbon fluid (e.g., fuel, lubricant, oil, etc.). In these embodiments, an igniter (e.g., spark plug, etc.) may be positioned downstream of the dosing module 121 and utilized to ignite the hydrocarbon fluid. This ignition causes an increase in temperature of the exhaust gas downstream of the dosing module 121, which may be utilized to regenerate the catalyst member 158.

In some embodiments, the first inlet tube 113, the second inlet tube 114, the mixing housing 115, and/or the decomposition housing 146 are integrally formed and made from a metal casting process, such as investment casting, sand casting, or another casting process. This may enable the first inlet tube 113, the second inlet tube 114, the mixing housing 115, and/or the decomposition housing 146 to be produced more economically, and therefore more desirably, than other components which require use of more complex or costly manufacturing processes.

In some embodiments, the first inlet tube 113, the second inlet tube 114, the mixing housing 115, and/or the decomposition housing 146 is integrally formed via additive manufacturing. For example, the first inlet tube 113, the second inlet tube 114, the mixing housing 115, and/or the decomposition housing 146 may be integrally formed using 3D printing, selective laser sintering, selective laser melting (SLM), direct metal laser sintering (DMLS), electron beam melting (EBM), ultrasonic additive manufacturing (UAM), fused deposition modeling (FDM), fused filament fabrication (FFF), stereolithography (SLA), material jetting, binder jetting or other similar processes. As explained above, the first inlet tube 113, the second inlet tube 114, the mixing housing 115, and/or the decomposition housing 146 is integrally formed when the portions of the first inlet tube 113, the second inlet tube 114, the mixing housing 115, and/or the decomposition housing 146 are formed and joined together as part of a single manufacturing step (e.g., 3D printing, selective laser sintering, SLM, DMLS, EBM, UAM, FDM, FFF, SLA, material jetting, binder jetting, etc.) to a create a single-piece or unitary construction, the first inlet tube 113, the second inlet tube 114, the mixing housing 115, and/or the decomposition housing 146, that cannot be disassembled without an at least partial destruction of the first inlet tube 113, the second inlet tube 114, the mixing housing 115, and/or the decomposition housing 146. For example, the portions of the first inlet tube 113, the second inlet tube 114, the mixing housing 115, and/or the decomposition housing 146 are: (i) not separable from each other (e.g., one portion of the first inlet tube 113, the second inlet tube 114, the mixing housing 115, and/or the decomposition housing 146 cannot be separated from the first inlet tube 113, the second inlet tube 114, the mixing housing 115, and/or the decomposition housing 146 without destroying the first inlet tube 113, the second inlet tube 114, the mixing housing 115, and/or the decomposition housing 146, etc.); (ii) not formed separately from each other (e.g., the portions of the first inlet tube 113, the second inlet tube 114, the mixing housing 115, and/or the decomposition housing 146 are formed simultaneously, the portions of the first inlet tube 113, the second inlet tube 114, the mixing housing 115, and/or the decomposition housing 146 are formed as a single component in a single process, etc.); and (iii) there are no gaps or joints along borders between contiguous portions of the first inlet tube 113, the second inlet tube 114, the mixing housing 115, and/or the decomposition housing 146 (e.g., portions that share a border, etc.).

In other embodiments, the first inlet tube 113, the second inlet tube 114, the mixing housing 115, and/or the decomposition housing 146 is formed via fabrication using sheet metal (e.g., via bending, via stamping, etc.) and welding. For example, the first inlet tube 113 may be formed from two or more pieces of sheet metal, where each piece is bent, and the pieces are welded together.

FIGS. 23-28 illustrate the housing assembly 104 according to various embodiments. In these embodiments, the reductant delivery system 120 includes a dosing lance 2300 (e.g., dosing line, pipe, conduit, etc.). The dosing lance 2300 extends from the injector 126 into the mixing housing 115 and functions to deliver the reductant from the injector 126 to the mixing housing 115. The dosing lance 2300 has a width (e.g., outer diameter, etc.) that is significantly less than a width (e.g., thickness, etc.) of the dosing module 121. For example, the dosing lance 2300 may have a width that is less than 10% of a width of the dosing module 121.

Figure 24:
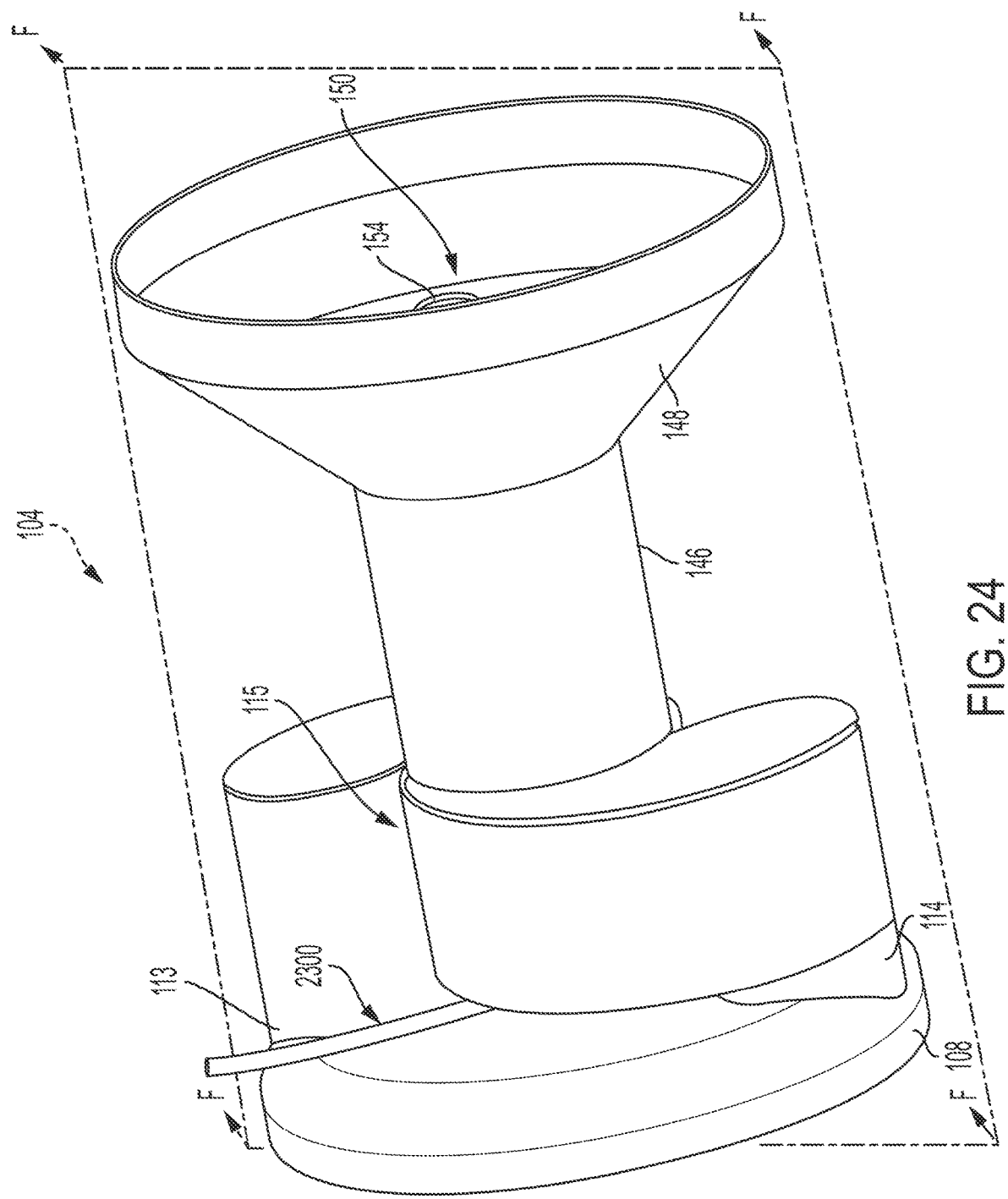
FIG. 24 is a rear perspective view of a portion of the housing assembly shown in FIG. 23.

As shown in FIG. 24, the dosing lance 2300 may extend across a portion (e.g., endcap, etc.) of the upstream housing 108 and between the first inlet tube 113 and the second inlet tube 114. The dosing lance 2300 includes a dosing lance tip 2302 (e.g., nozzle, etc.). The dosing lance tip 2302 is located within the mixing housing 115 and delivers the reductant from the dosing lance 2300 into the mixing housing 115. The dosing lance tip 2302 may include a single opening through which the reductant is provided into the mixing housing 115. In some applications, the dosing lance tip 2302 may include multiple openings through which the reductant is provided into the mixing housing 115. For example, the dosing lance tip 2302 may include four openings.

Figure 25:
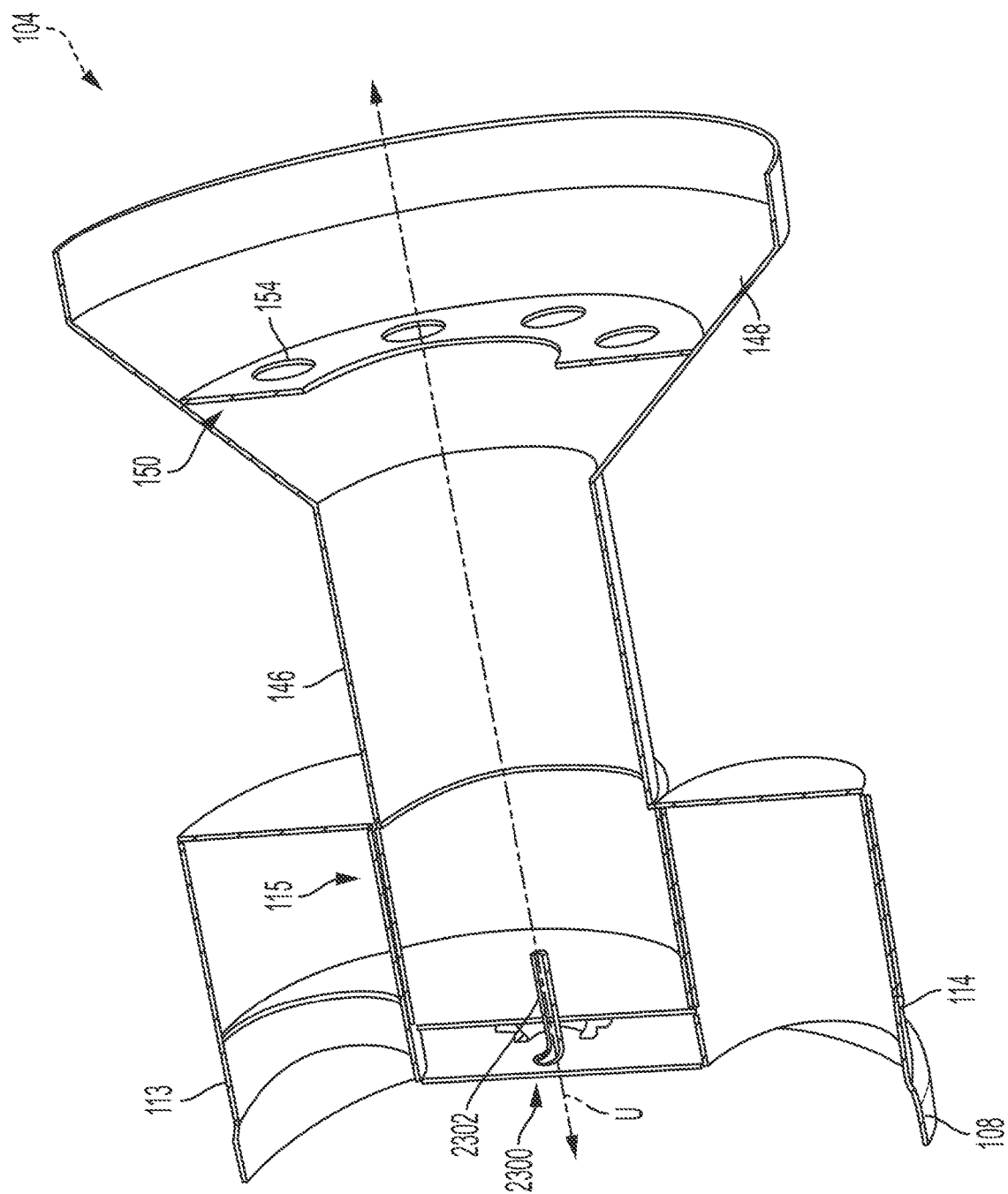
FIG. 25 is a cross-sectional view of the portion of the housing assembly shown in FIG. 25 taken along plane F-F in FIG. 24.
Figure 26:
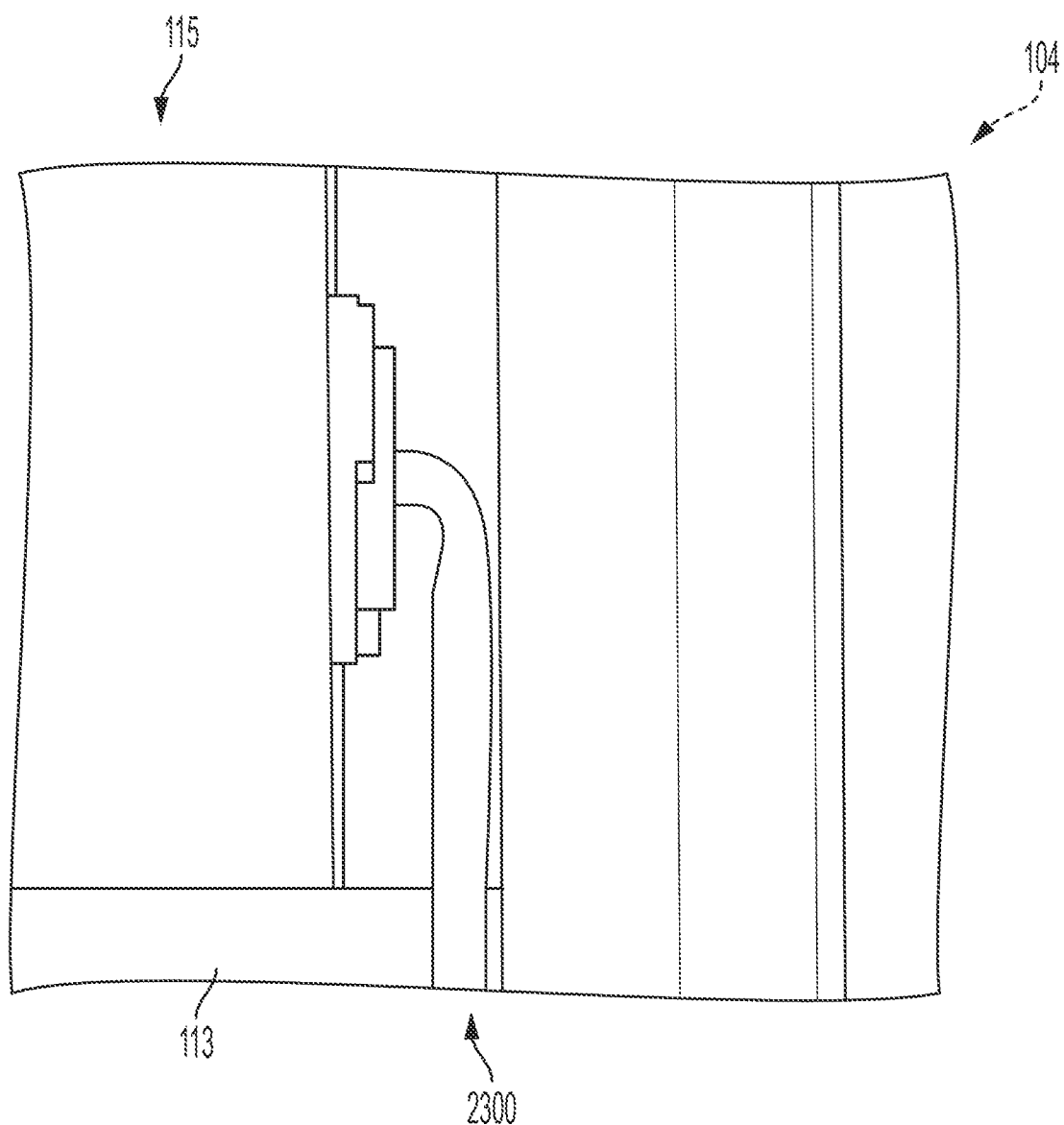
FIG. 26 is a detailed view of DETAIL A shown in FIG. 23.
Figure 27:
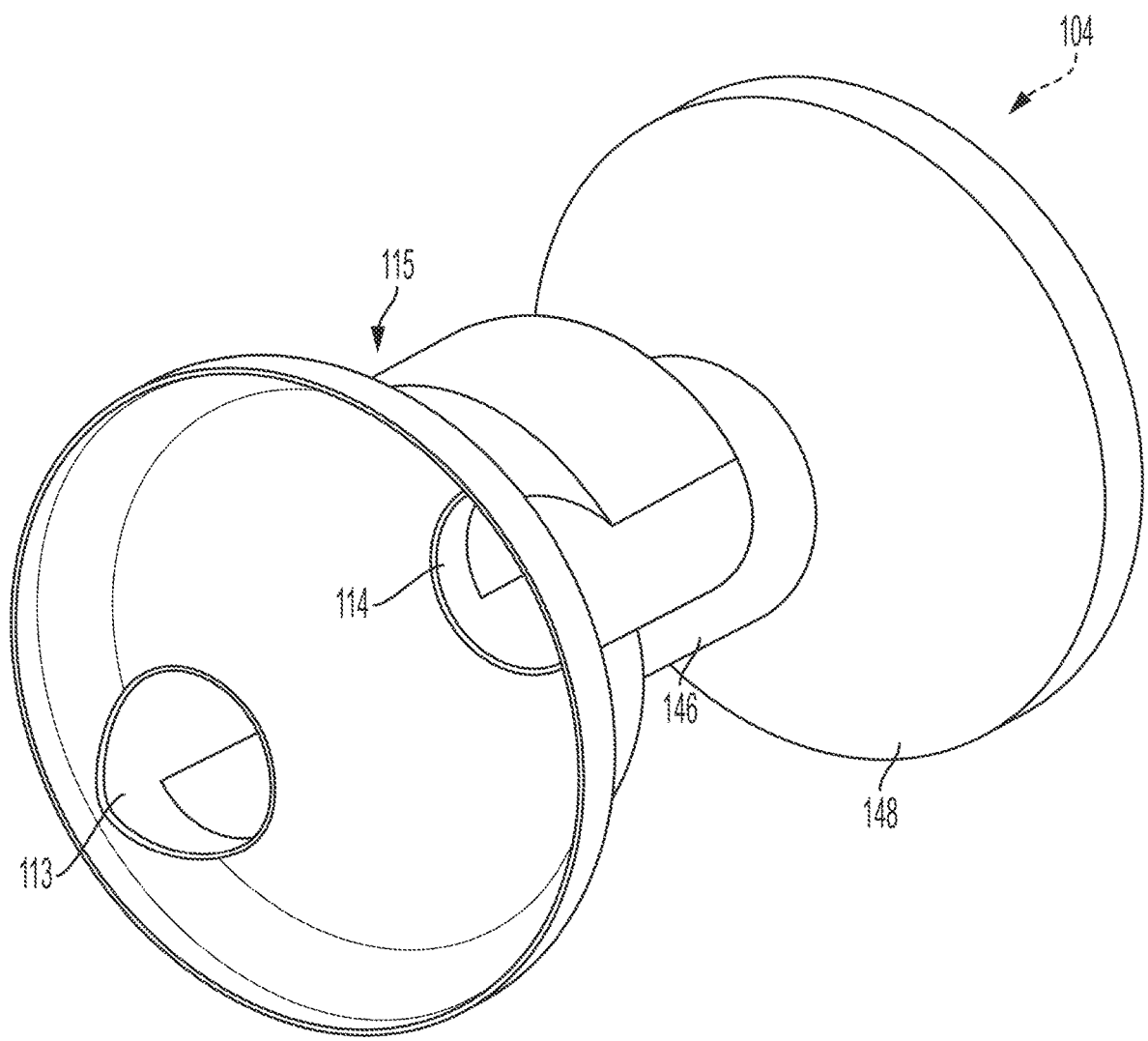
FIG. 27 is a front perspective view of a portion of the housing assembly shown in FIG. 23.
Figure 28:
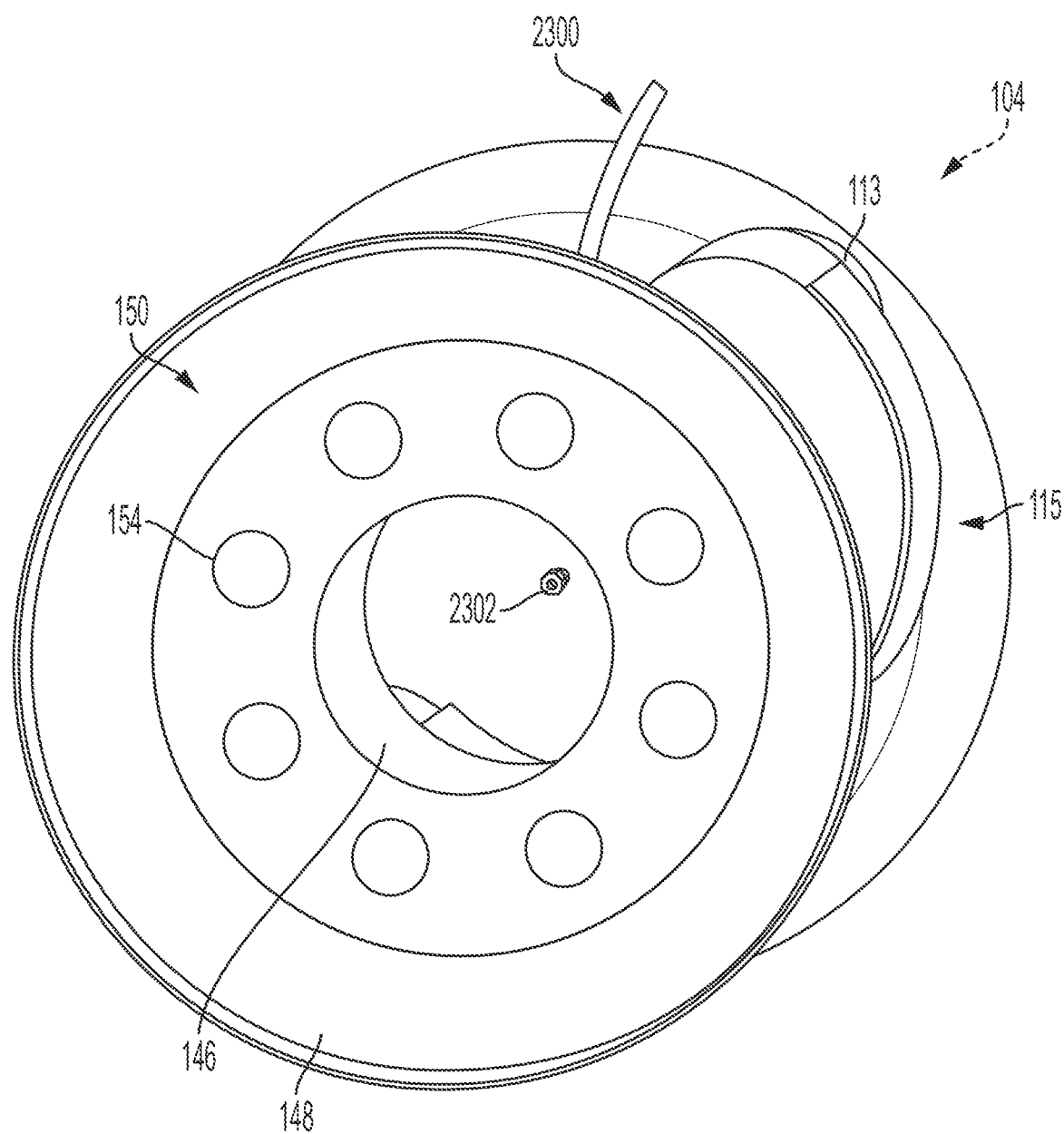
FIG. 28 is another rear perspective view of a portion of the housing assembly shown in FIG. 23.
Figure 29:
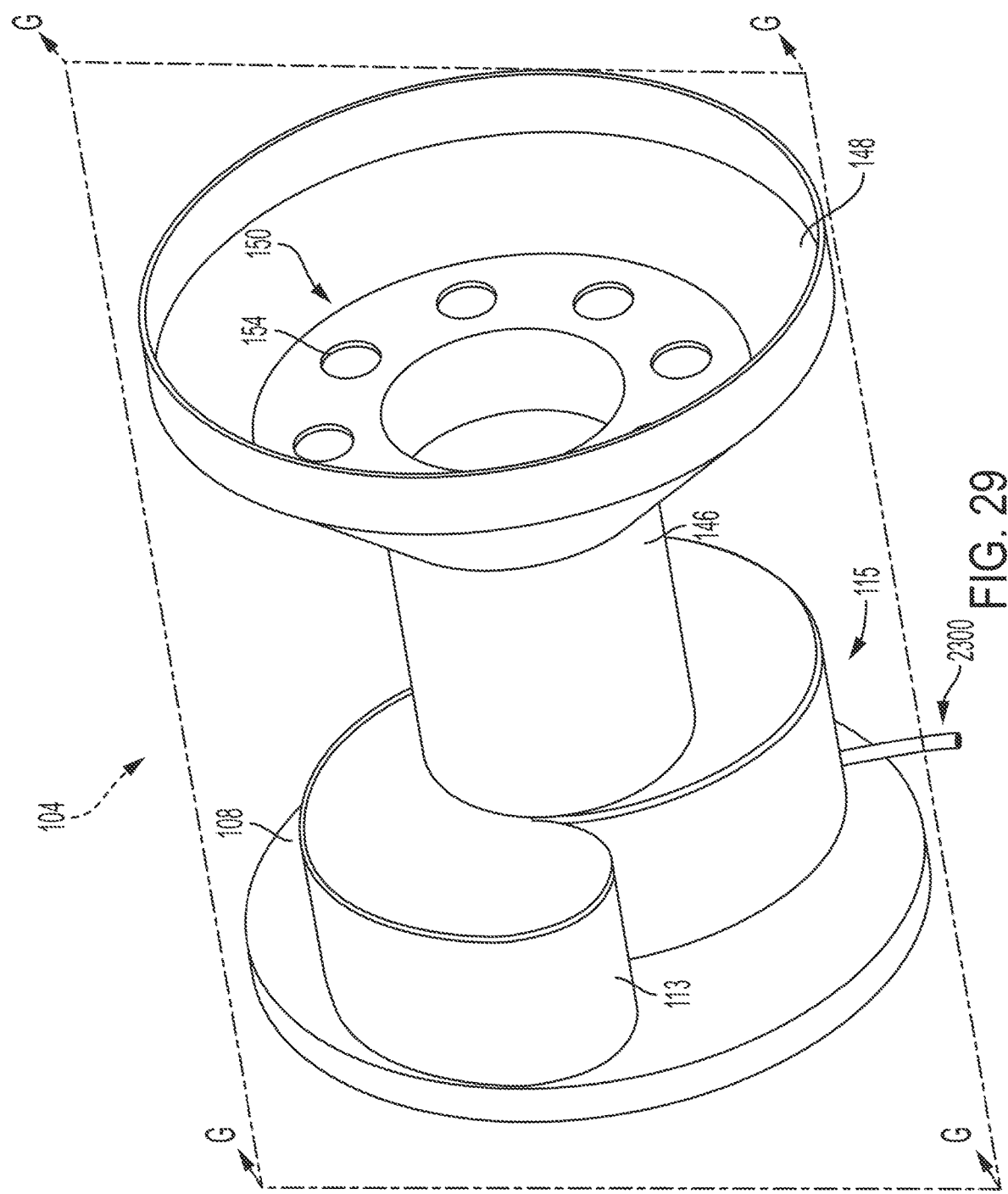
FIG. 29 is a rear perspective view of a portion of yet another example housing assembly for an exhaust gas aftertreatment system.

The dosing lance 2300 may be variously configured (e.g., by including multiple bends, by having different lengths, by having different internal diameters, etc.) such that delivery of the reductant to the mixing housing 115 is optimized for a target application. For example, the dosing lance 2300 may be variously configured such that the dosing lance tip 2302 is positioned at a target location within the mixing housing 115. As shown in FIG. 25, the dosing lance 2300 may be configured such that the dosing lance tip 2302 is positioned along the decomposition housing axis U. As a result of this positioning, the dosing lance tip 2302 may provide the reductant into the mixing housing 115 such that the exhaust gas swirls around the reductant and the reductant is propelled into the decomposition housing 146.

The dosing lance 2300 may also be constructed from various materials such that the dosing lance 2300 is tailored for a target application. In some embodiments, the dosing lance 2300 is constructed from a metal (e.g., steel, etc.). The dosing lance 2300 may also be constructed so as to minimize heat transfer from exhaust gas to reductant within the dosing lance 2300. For example, the dosing lance 2300 may be constructed from a specific steel compound (e.g., stainless steel, etc.) that has a relatively low thermal conductivity. Additionally, insulation (e.g., ceramic insulation, etc.) may be deployed to cover various portions of the dosing lance 2300 to mitigate heat transfer to the reductant within the dosing lance 2300.

Importantly, the dosing module 121 is not positioned within the decomposition housing space 119. Instead, the dosing module 121 is positioned outside of the decomposition housing space 119. For example, the dosing module 121 may be coupled to the upstream housing 108, the first inlet tube 113, the second inlet tube 114, or the decomposition housing 146. In various embodiments, the dosing module 121 is not coupled to the mixing housing 115.

As a result of removing the dosing module 121 from the decomposition housing space 119, the housing assembly 104 can be configured such that a size of the decomposition housing space 119 is significantly decreased because the dosing lance 2300 has a width that is significantly less than a width of the dosing module 121. This decreases the decomposition housing cavity length M and therefore an overall length of the housing assembly 104 compared to arrangements where the dosing module 121 is positioned within the decomposition housing space 119. Specifically, the length of the first inlet tube 113 and the length of the second inlet tube 114 are decreased when the dosing module 121 is removed from the decomposition housing space 119 and the dosing lance 2300 is utilized. By decreasing the overall length of the housing assembly 104, the housing assembly 104 may be more desirable in applications with certain space constraints. In some embodiments, the decomposition housing cavity length M is zero and the mixing housing 115 is coupled to the upstream housing 108.

Figure 30:
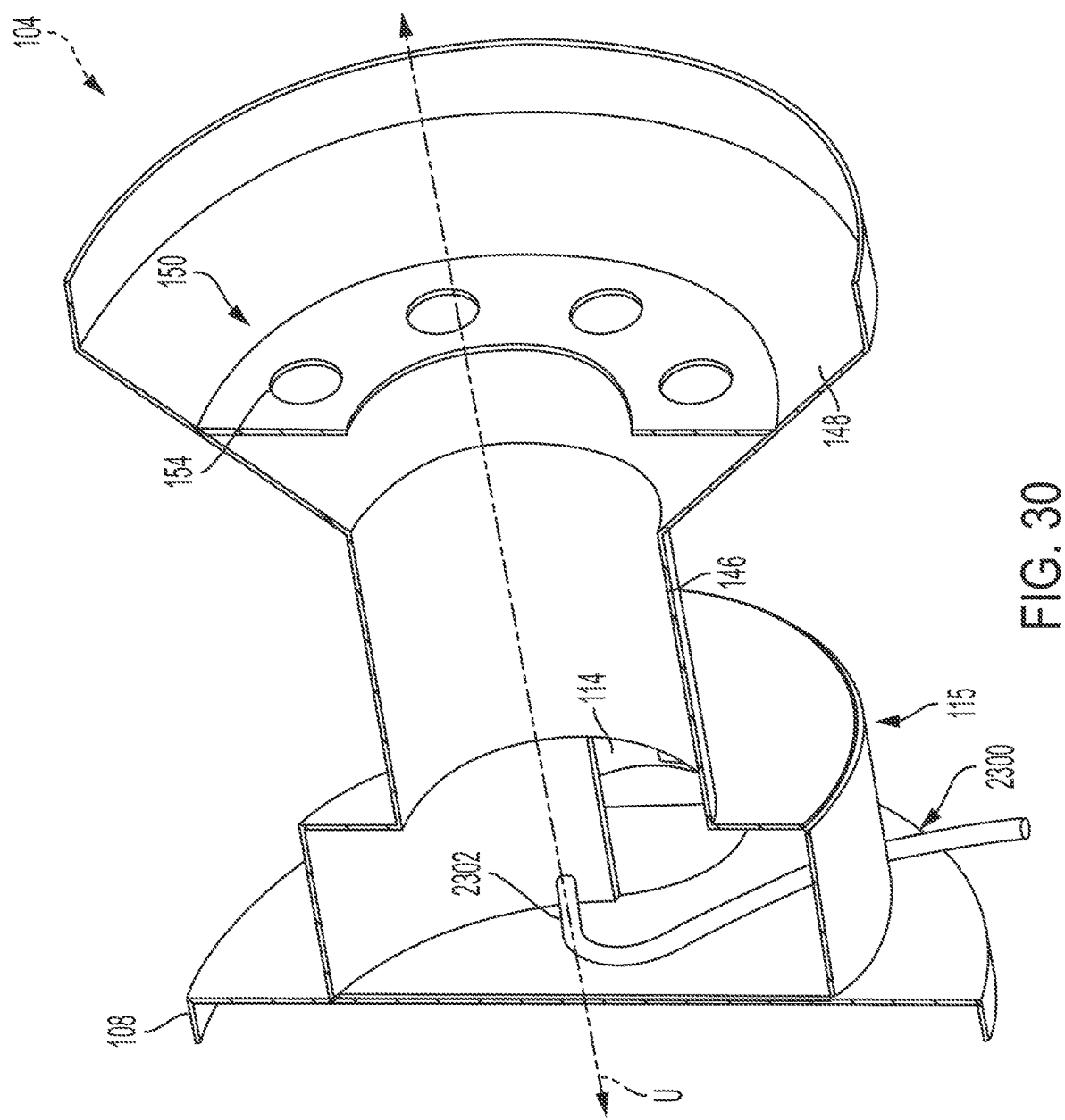
FIG. 30 is a cross-sectional view of the portion of the housing assembly shown in FIG. 29 taken along plane G-G in FIG. 29.
Figure 31:
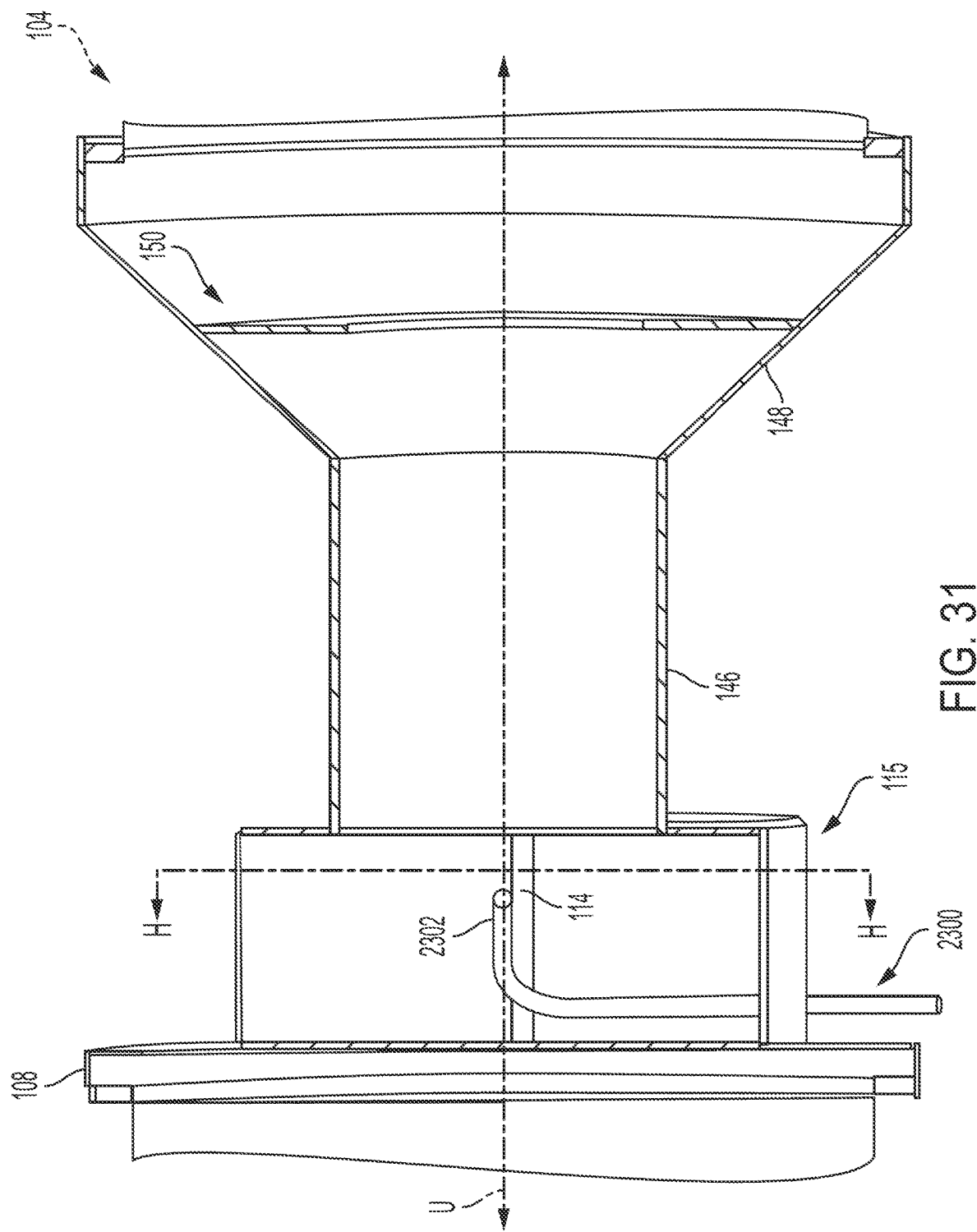
FIG. 31 is another cross-sectional view of the portion of the housing assembly shown in FIG. 29 taken along plane G-G in FIG. 29.
Figure 32:
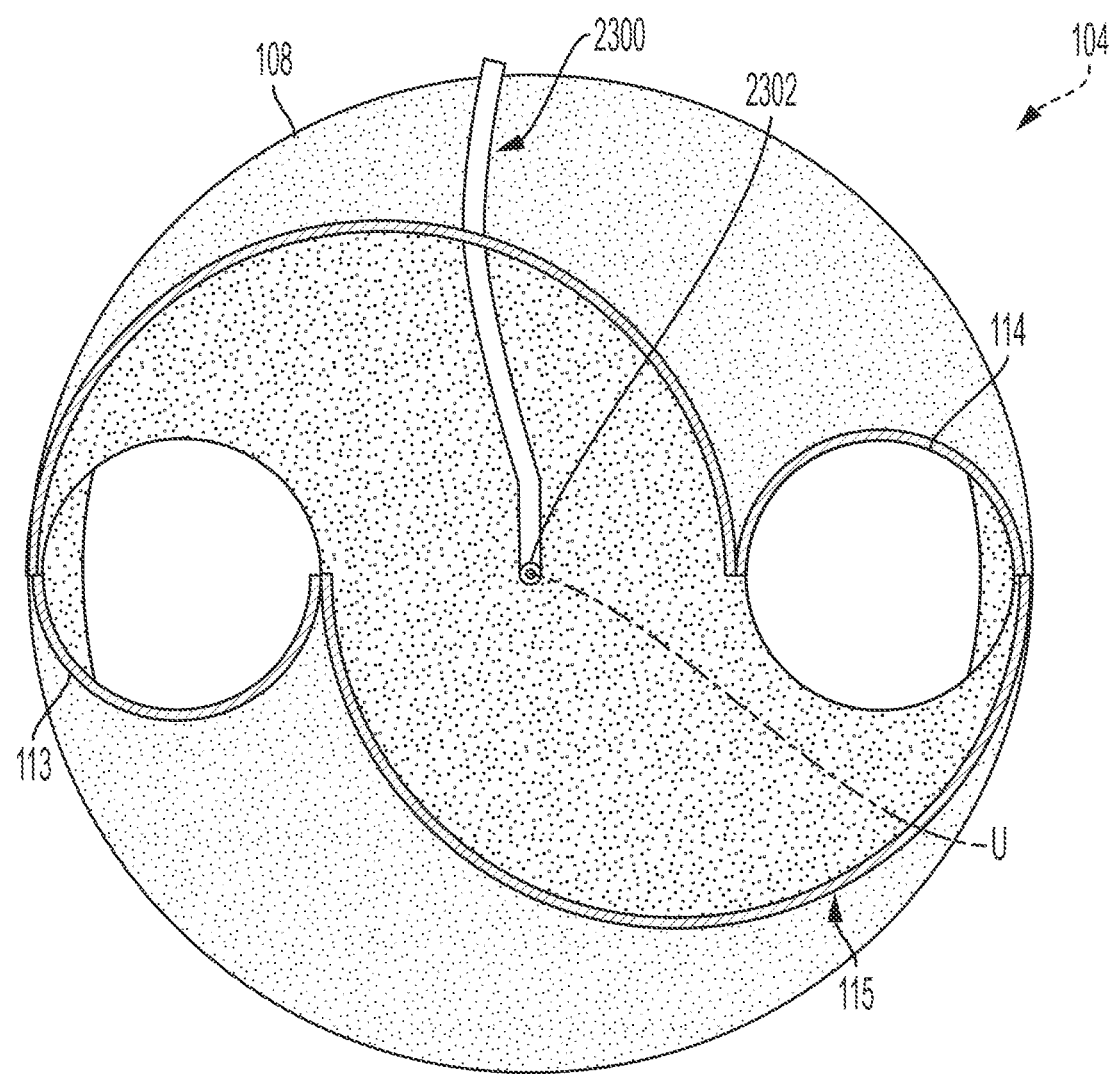
FIG. 32 is a cross-sectional view of the portion of the housing assembly shown in FIG. 29 taken along plane H-H in FIG. 31.
Figure 33:
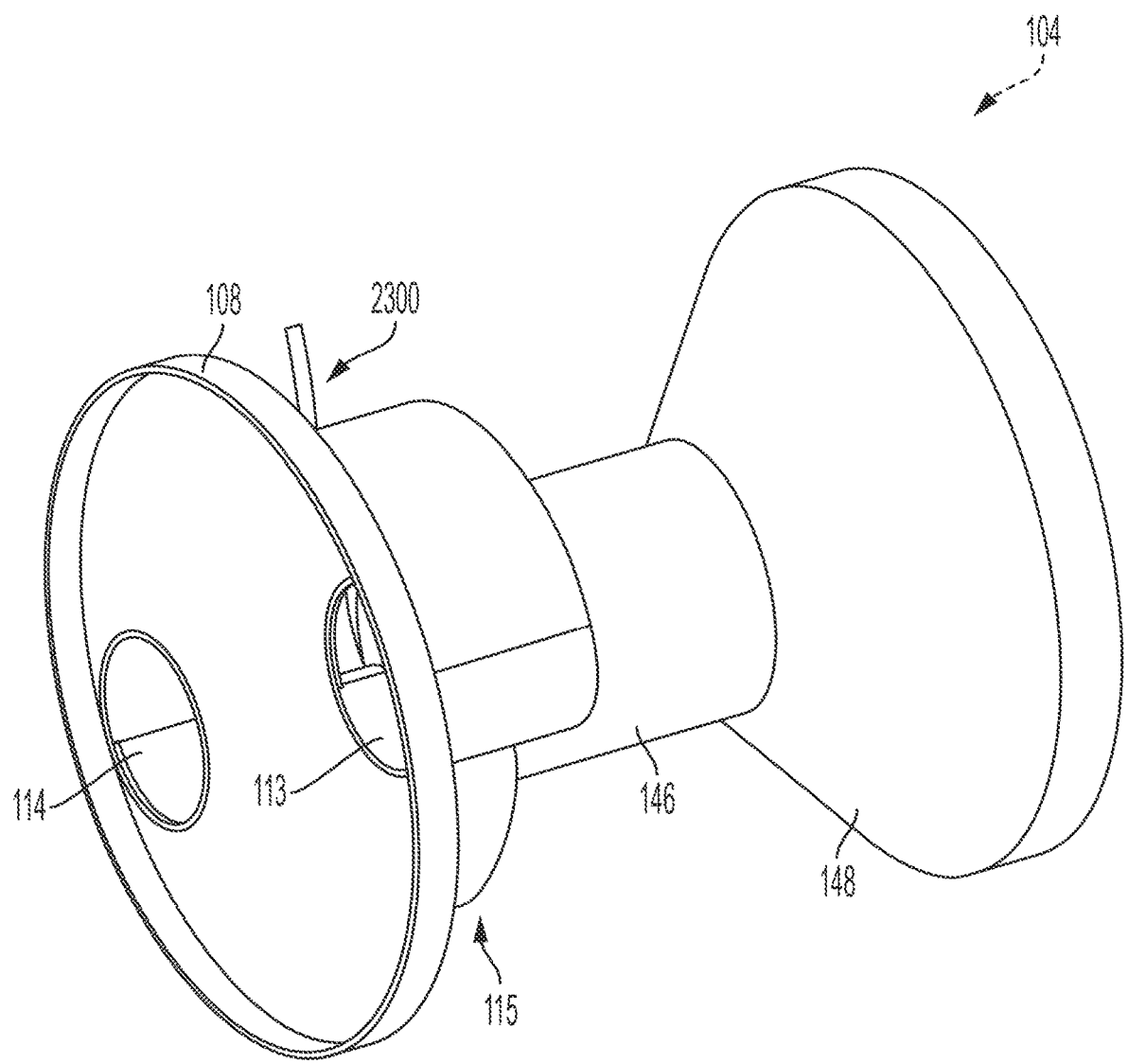
FIG. 33 is a front perspective view of the portion of the housing assembly shown in FIG. 29.

The dosing lance 2300 may be utilized in other configurations of the housing assembly 104. For example, as shown in FIGS. 29-34, the dosing lance 2300 may be utilized where the mixing housing 115, the first inlet tube 113, the second inlet tube 114, and the upstream housing 108 do not define the decomposition housing space 119 (e.g., the decomposition housing cavity length M is 0 mm, etc.). Instead of being positioned within the decomposition housing space 119 as in the embodiments of FIGS. 23-28, the dosing lance 2300 instead extends through the mixing housing 115 and extends within the mixing housing 115 such that the dosing lance tip 2302 is located at a target position within the mixing housing 115. For example, the dosing lance 2300 may be configured such that the dosing lance tip 2302 is positioned along the decomposition housing axis U, as shown in FIGS. 30 and 31.

While the annular flange 150 has primarily been described herein as including the central opening 152 and the apertures 154, other configurations of the annular flange 150 may be utilized. For example, any or all of the apertures 154 and/or the central opening 152 may be replaced by a region of concentrated perforations (e.g., holes, etc.). Additionally or alternatively, any or all of the apertures 154 and/or the central opening 152 may be covered by a mesh (e.g., screen, etc.).

Figure 34:
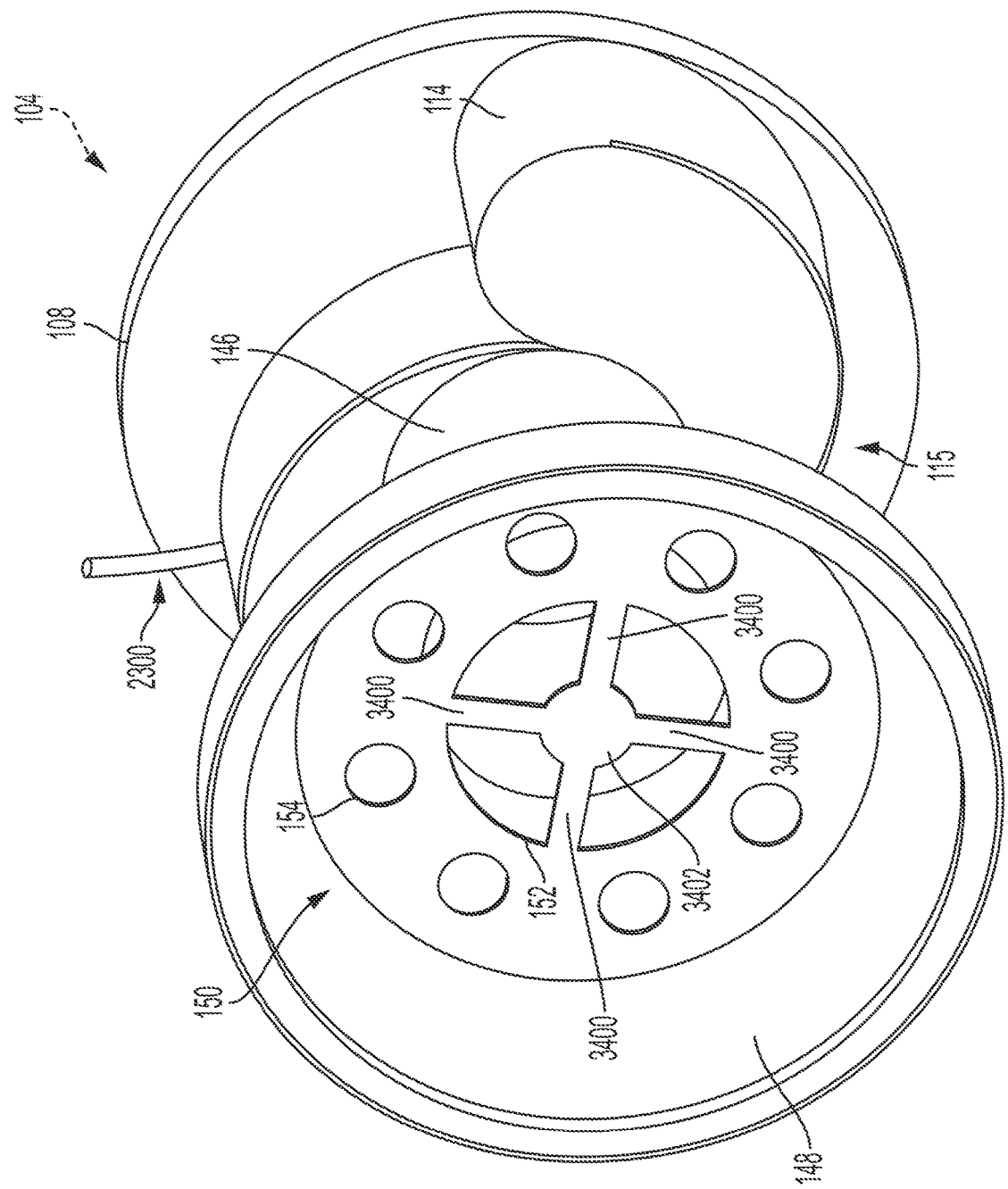
FIG. 34 is another rear perspective view of the portion of the housing assembly shown in FIG. 29, according to some embodiments.

FIG. 34 illustrates the annular flange 150 according to various embodiments. In addition to including the central opening 152 and the apertures 154, the annular flange 150 includes a plurality of crossbars 3400 (e.g., arms, etc.). Each of the crossbars 3400 extends across a portion of the central opening 152. The annular flange 150 also includes a blocking panel 3402 (e.g., central panel, etc.). The blocking panel 3402 is contiguous with each of the crossbars 3400, and the crossbars 3400 support the blocking panel 3402 within the central opening 152. As a result of this configuration, the exhaust gas flows through the central opening 152 by flowing between two of the crossbars 3400 and the blocking panel 3402. The crossbars 3400 and the blocking panel 3402 may assist the apertures 154 in facilitating smoothing of a flow of the exhaust gas prior to the exhaust gas exiting the divergent housing 148.

In some embodiments, a second annular flange having a construction similar to the annular flange 150 is also included in the housing assembly 104. The second annular flange is coupled to and disposed within the divergent housing 148 and extends across an inner surface of the divergent housing 148. Use of the second annular flange may provide some flexibility in the construction of the annular flange 150. For example, the annular flange 150 may include only the central opening 152 and not include any of the apertures 154, while the second annular flange includes apertures similar to the apertures 154 and does not include a central opening similar to the central opening 152.

III. CONFIGURATION OF EXAMPLE EMBODIMENTS

As utilized herein, an area is measured along a plane (e.g., a two-dimensional plane, etc.) unless otherwise indicated. This area may change in a direction that is not disposed along the plane (e.g., along a direction that is orthogonal to the plane, etc.) unless otherwise indicated.

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another, with the two components, or with the two components and any additional intermediate components being attached to one another.

The terms "configured to receive exhaust gas from," "configured to receive air from," "configured to receive reductant from," and the like, as used herein, mean the two components or objects have a pathway formed between the two components or objects in which a fluid, such as air, reductant, an air-reductant mixture, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An exhaust gas aftertreatment system comprising:
a housing assembly comprising:
an upstream housing,
a first inlet tube coupled to the upstream housing and configured to receive a first portion of exhaust gas from the upstream housing,
a second inlet tube coupled to the upstream housing and configured to receive a second portion of the exhaust gas from the upstream housing, and
a mixing housing coupled to the first inlet tube and the second inlet tube, the mixing housing configured to receive the first portion of the exhaust gas from the first inlet tube and receive the second portion of the exhaust gas from the second inlet tube, the mixing housing separated from the upstream housing by the first inlet tube and the second inlet tube; and
a reductant delivery system comprising a dosing module coupled to the mixing housing and positioned between the mixing housing, the first inlet tube, and the second inlet tube, the dosing module comprising an injector configured to provide reductant into the mixing housing.

2. The exhaust gas aftertreatment system of claim 1, wherein the mixing housing comprises:
a first curved surface contiguous with the first inlet tube and the second inlet tube; and
a second curved surface contiguous with the first inlet tube and the second inlet tube.

3. The exhaust gas aftertreatment system of claim 2, wherein:
the first curved surface follows a first curvature of the first inlet tube and terminates at the second inlet tube; and
the second curved surface follows a second curvature of the second inlet tube and terminates at the first inlet tube.

4. The exhaust gas aftertreatment system of claim 1, wherein:
the first inlet tube is centered on a first inlet tube axis; and
the second inlet tube is centered on a second inlet tube axis that is parallel to the first inlet tube axis.

5. The exhaust gas aftertreatment system of claim 1, wherein:
the injector is configured to provide the reductant within the mixing housing along an injector axis;
the first inlet tube is centered on a first inlet tube axis;
the second inlet tube is centered on a second inlet tube axis; and
at least one of:
the first inlet tube is configured such that the first inlet tube axis is parallel to the injector axis; or
the second inlet tube is configured such that the second inlet tube axis is parallel to the injector axis.

6. The exhaust gas aftertreatment system of claim 1, wherein the housing assembly further comprises:
a decomposition housing coupled to the mixing housing and configured to receive the exhaust gas from the mixing housing, the decomposition housing having a decomposition housing diameter that is constant; and
a divergent housing coupled to the decomposition housing and configured to receive the exhaust gas from the decomposition housing, the divergent housing having a diameter that increases as a distance from the decomposition housing increases.

7. The exhaust gas aftertreatment system of claim 6, wherein:
the upstream housing is centered on an upstream housing axis; and
the decomposition housing is centered on a decomposition housing axis that is coincident with the upstream housing axis.

8. The exhaust gas aftertreatment system of claim 6, wherein:
the injector is configured to provide the reductant within the mixing housing along an injector axis; and
the decomposition housing is centered on a decomposition housing axis that is coincident with the injector axis.

9. An exhaust gas aftertreatment system comprising:
a housing assembly comprising:
an upstream housing centered on an upstream housing axis,
a first inlet tube coupled to the upstream housing and configured to receive a first portion of exhaust gas from the upstream housing,
a second inlet tube coupled to the upstream housing and configured to receive a second portion of the exhaust gas from the upstream housing,
a mixing housing coupled to the first inlet tube and the second inlet tube, the mixing housing configured to receive the first portion of the exhaust gas from the first inlet tube and receive the second portion of the exhaust gas from the second inlet tube, and
a divergent housing configured to receive the exhaust gas from the mixing housing, the divergent housing having a diameter that increases as a distance from the mixing housing increases; and
a reductant delivery system comprising a dosing module coupled to the mixing housing, the dosing module comprising an injector configured to provide reductant into the mixing housing.

10. The exhaust gas aftertreatment system of claim 9, wherein the divergent housing is centered on a divergent housing axis that is coincident with the upstream housing axis.

11. The exhaust gas aftertreatment system of claim 10, wherein:
the injector is configured to provide the reductant within the mixing housing along an injector axis; and
the injector axis is coincident with the upstream housing axis.

12. The exhaust gas aftertreatment system of claim 9, wherein the housing assembly further comprises an annular flange coupled to and disposed within the divergent housing, the annular flange comprising a central opening and a plurality of apertures disposed around the central opening, each of the apertures and the central opening configured to facilitate flow of the exhaust gas through the annular flange.

13. The exhaust gas aftertreatment system of claim 9, wherein the mixing housing comprises:
a first curved surface contiguous with the first inlet tube and the second inlet tube; and
a second curved surface contiguous with the first inlet tube and the second inlet tube.

14. The exhaust gas aftertreatment system of claim 13, wherein:
the first curved surface follows a first curvature of the first inlet tube and terminates at the second inlet tube; and
the second curved surface follows a second curvature of the second inlet tube and terminates at the first inlet tube.

15. The exhaust gas aftertreatment system of claim 9, wherein:
the first inlet tube is centered on a first inlet tube axis that is parallel with the upstream housing axis; and
the second inlet tube is centered on a second inlet tube axis that is parallel with the upstream housing axis.

16. An exhaust gas aftertreatment system comprising:
a housing assembly comprising:
an upstream housing centered on an upstream housing axis,
a first inlet tube coupled to the upstream housing, centered on a first inlet tube axis parallel to the upstream housing axis, and configured to receive a first portion of exhaust gas from the upstream housing,
a second inlet tube coupled to the upstream housing, centered on a second inlet tube axis parallel to the upstream housing axis, and configured to receive a second portion of the exhaust gas from the upstream housing,
a mixing housing coupled to the first inlet tube and the second inlet tube, the mixing housing configured to receive the first portion of the exhaust gas from the first inlet tube and receive the second portion of the exhaust gas from the second inlet tube, the mixing housing separated from the upstream housing by the first inlet tube and the second inlet tube, and
a decomposition housing coupled to the mixing housing and configured to receive the exhaust gas from the mixing housing, the decomposition housing having a diameter that is constant and centered on a decomposition housing axis that is coincident with the upstream housing axis; and
a reductant delivery system comprising a dosing module coupled to the mixing housing, the dosing module comprising an injector configured to provide reductant into the mixing housing.

17. The exhaust gas aftertreatment system of claim 16, wherein:
the injector is configured to provide the reductant within the mixing housing along an injector axis; and
the injector axis is coincident with the upstream housing axis.

18. The exhaust gas aftertreatment system of claim 17, wherein the mixing housing comprises:
a first curved surface contiguous with the first inlet tube and the second inlet tube; and
a second curved surface contiguous with the first inlet tube and the second inlet tube.

19. The exhaust gas aftertreatment system of claim 18, wherein:
the first curved surface follows a first curvature of the first inlet tube and terminates at the second inlet tube; and
the second curved surface follows a second curvature of the second inlet tube and terminates at the first inlet tube.

20. The exhaust gas aftertreatment system of claim 16, wherein:
the first inlet tube axis is separated from the upstream housing axis by a first separation distance; and
the second inlet tube axis is separated from the upstream housing axis by a second separation distance equal to the first separation distance.

21. An exhaust gas aftertreatment system comprising:
a housing assembly comprising:
an upstream housing centered on an upstream housing axis,
a first inlet tube coupled to the upstream housing, centered on a first inlet tube axis parallel to the upstream housing axis, and configured to receive a first portion of exhaust gas from the upstream housing,
a second inlet tube coupled to the upstream housing, centered on a second inlet tube axis parallel to the upstream housing axis, and configured to receive a second portion of the exhaust gas from the upstream housing,
a mixing housing coupled to the first inlet tube and the second inlet tube, the mixing housing configured to receive the first portion of the exhaust gas from the first inlet tube and receive the second portion of the exhaust gas from the second inlet tube, the mixing housing separated from the upstream housing by the first inlet tube and the second inlet tube, and
a decomposition housing coupled to the mixing housing and configured to receive the exhaust gas from the mixing housing, the decomposition housing having a diameter that is constant and centered on a decomposition housing axis that is coincident with the upstream housing axis; and
a reductant delivery system comprising:
a dosing module including an injector; and
a dosing lance coupled to the dosing module and configured to receive reductant from the injector and to provide the reductant into the mixing housing, the dosing lance extending within the mixing housing.

22. The exhaust gas aftertreatment system of claim 21, wherein a portion of the dosing lance is positioned between the upstream housing and the mixing housing.

23. The exhaust gas aftertreatment system of claim 21, wherein the mixing housing is coupled to the upstream housing.

24. The exhaust gas aftertreatment system of claim 21, wherein the dosing module is not coupled to the mixing housing.

\* \* \* \* \*